(12) United States Patent
Yasushi et al.

(10) Patent No.: US 8,798,901 B2
(45) Date of Patent: Aug. 5, 2014

(54) TRAVEL DISTANCE ESTIMATING APPARATUS, TRAVEL DISTANCE ESTIMATING METHOD, TRAVEL DISTANCE ESTIMATING PROGRAM, AND RECORDING MEDIUM

(75) Inventors: Mitsuo Yasushi, Sayama (JP); Susumu Ohsawa, Sakado (JP); Tatsuya Fukuda, Saitama (JP); Kyoichiro Fujii, Kawagoe (JP)

(73) Assignee: Pioneer Corporation, Kanagawa (JP)

( * ) Notice: Subject to any disclaimer, the term of this patent is extended or adjusted under 35 U.S.C. 154(b) by 0 days.

(21) Appl. No.: 13/822,012

(22) PCT Filed: Sep. 17, 2010

(86) PCT No.: PCT/JP2010/066256
§ 371 (c)(1),
(2), (4) Date: Mar. 11, 2013

(87) PCT Pub. No.: WO2012/035667
PCT Pub. Date: Mar. 22, 2012

(65) Prior Publication Data
US 2013/0179062 A1 Jul. 11, 2013

(51) Int. Cl.
*B60W 20/00* (2006.01)
*G01C 21/00* (2006.01)
(52) U.S. Cl.
USPC ............................................ 701/123; 702/45
(58) Field of Classification Search
USPC .................................. 701/123, 1, 36; 702/45
See application file for complete search history.

(56) References Cited

U.S. PATENT DOCUMENTS

| | | | | |
|---|---|---|---|---|
| 2005/0251299 | A1* | 11/2005 | Donnelly et al. | 701/19 |
| 2009/0212626 | A1* | 8/2009 | Snyder et al. | 307/10.1 |
| 2013/0158898 | A1* | 6/2013 | Fukuda et al. | 702/45 |

FOREIGN PATENT DOCUMENTS

| | | |
|---|---|---|
| JP | 2000-002553 | 1/2000 |
| JP | 2005-218178 | 8/2005 |
| JP | 2006-300780 | 11/2006 |
| JP | 2009-031046 | 2/2009 |
| JP | 2009-067350 | 4/2009 |
| JP | 2009-193425 | 8/2009 |
| JP | 2010-122117 | 6/2010 |
| JP | 2010-122148 | 6/2010 |

OTHER PUBLICATIONS

International Search Report PCT/JP2010/066256 dated Nov. 9, 2010, with English translation.

* cited by examiner

*Primary Examiner* — Tan Q Nguyen
(74) *Attorney, Agent, or Firm* — Young & Thompson

(57) ABSTRACT

A travel distance estimating apparatus (100) estimates a travel distance of a moving body in a given section through which the moving body travels (hereinafter referred to as a "travel interval"). A current position acquiring unit (101) acquires the current position of the moving body. A variable acquiring unit (102) acquires information related to the speed of the moving body in the travel interval. An estimating unit (103) estimates based on a consumed energy estimating equation, energy consumption and a travelable distance for travel through the travel interval. A correcting unit (104) corrects information related to the moving body and used as variables of the consumed energy estimating equation. A storage unit (105) stores information related to roads associated with a travel history of the moving body. A display unit (110) displays map data including information related to travelable distance calculated by the estimating unit (103).

15 Claims, 10 Drawing Sheets

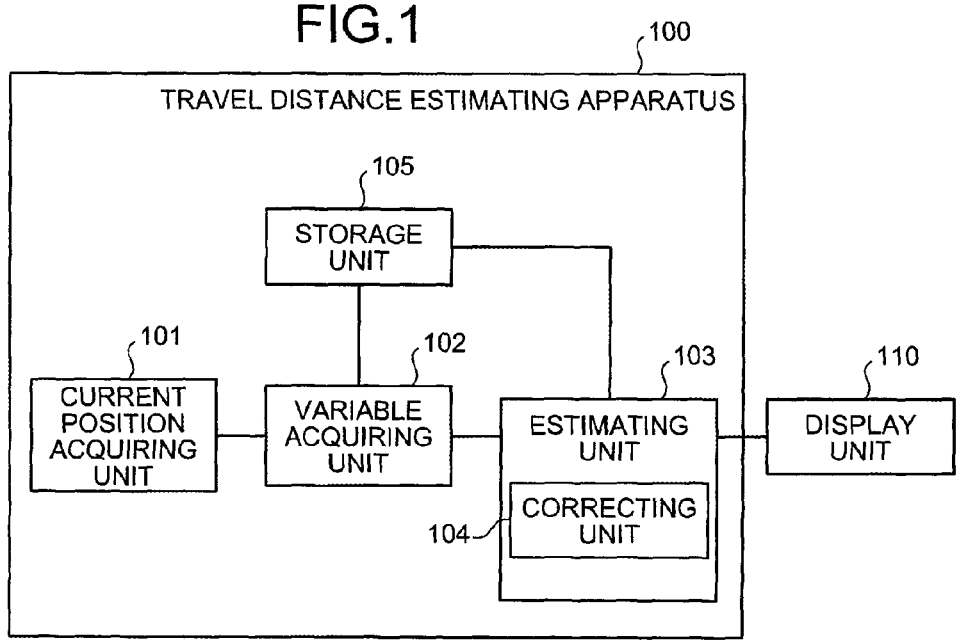
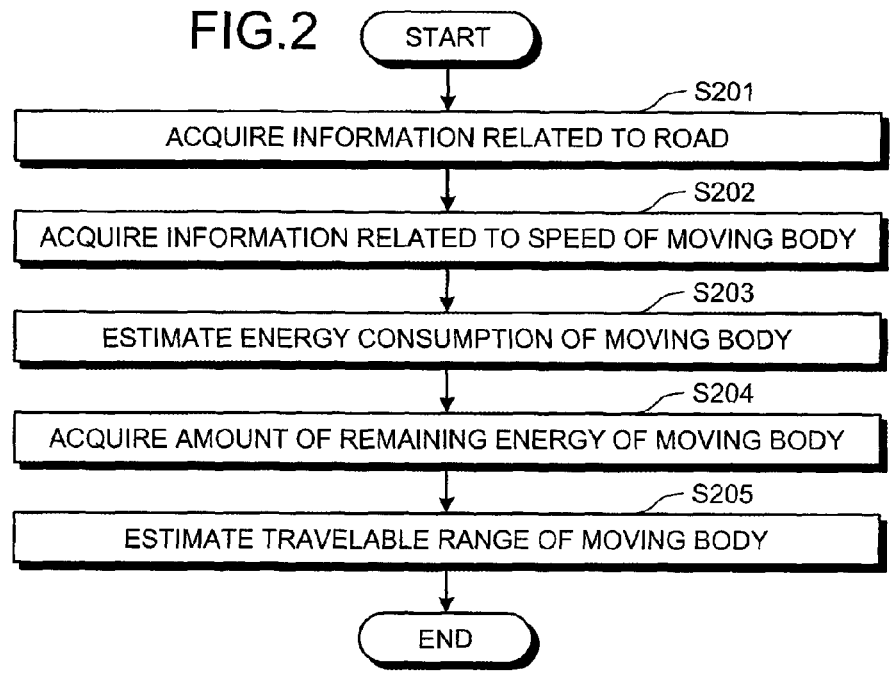

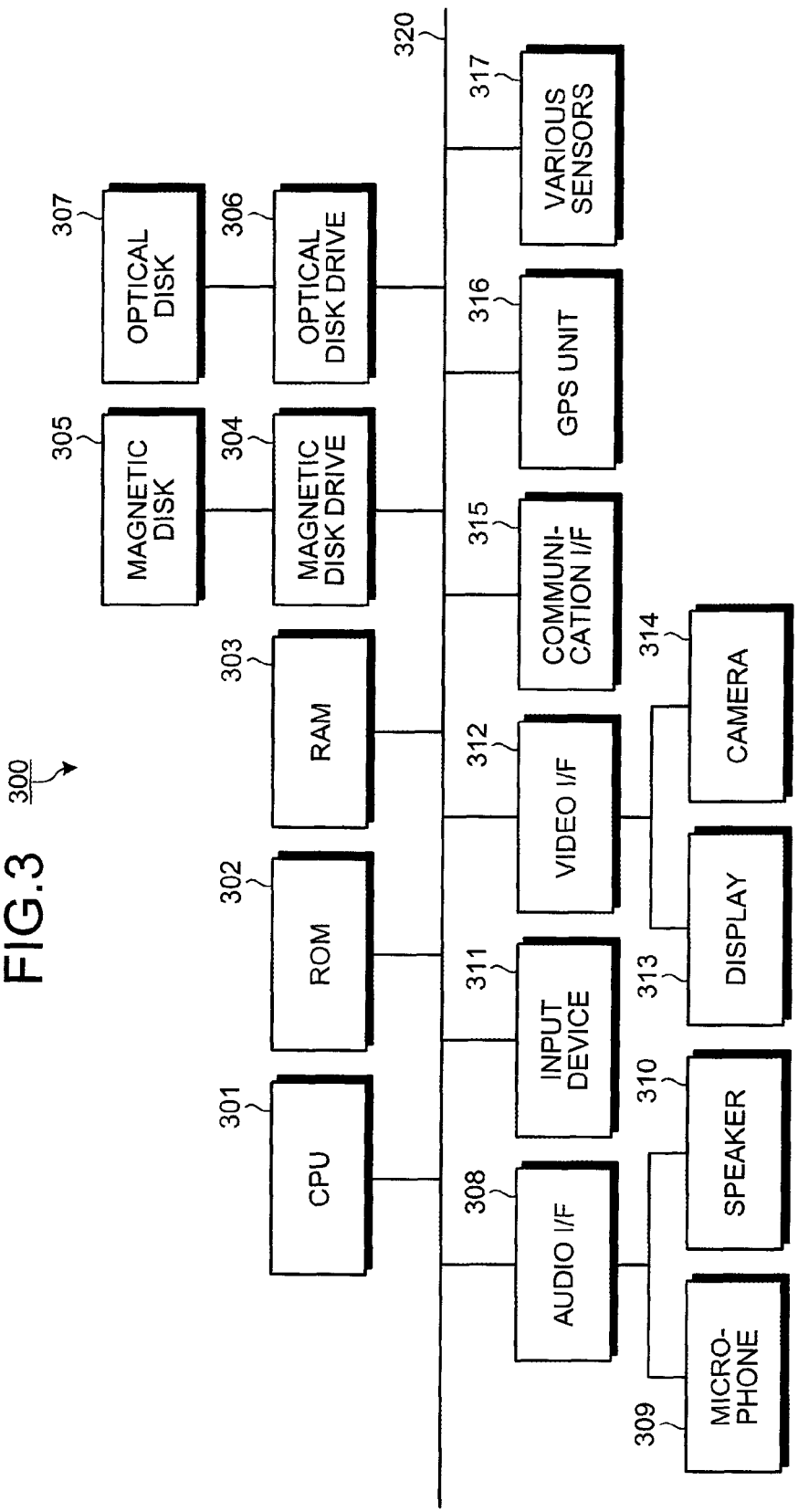

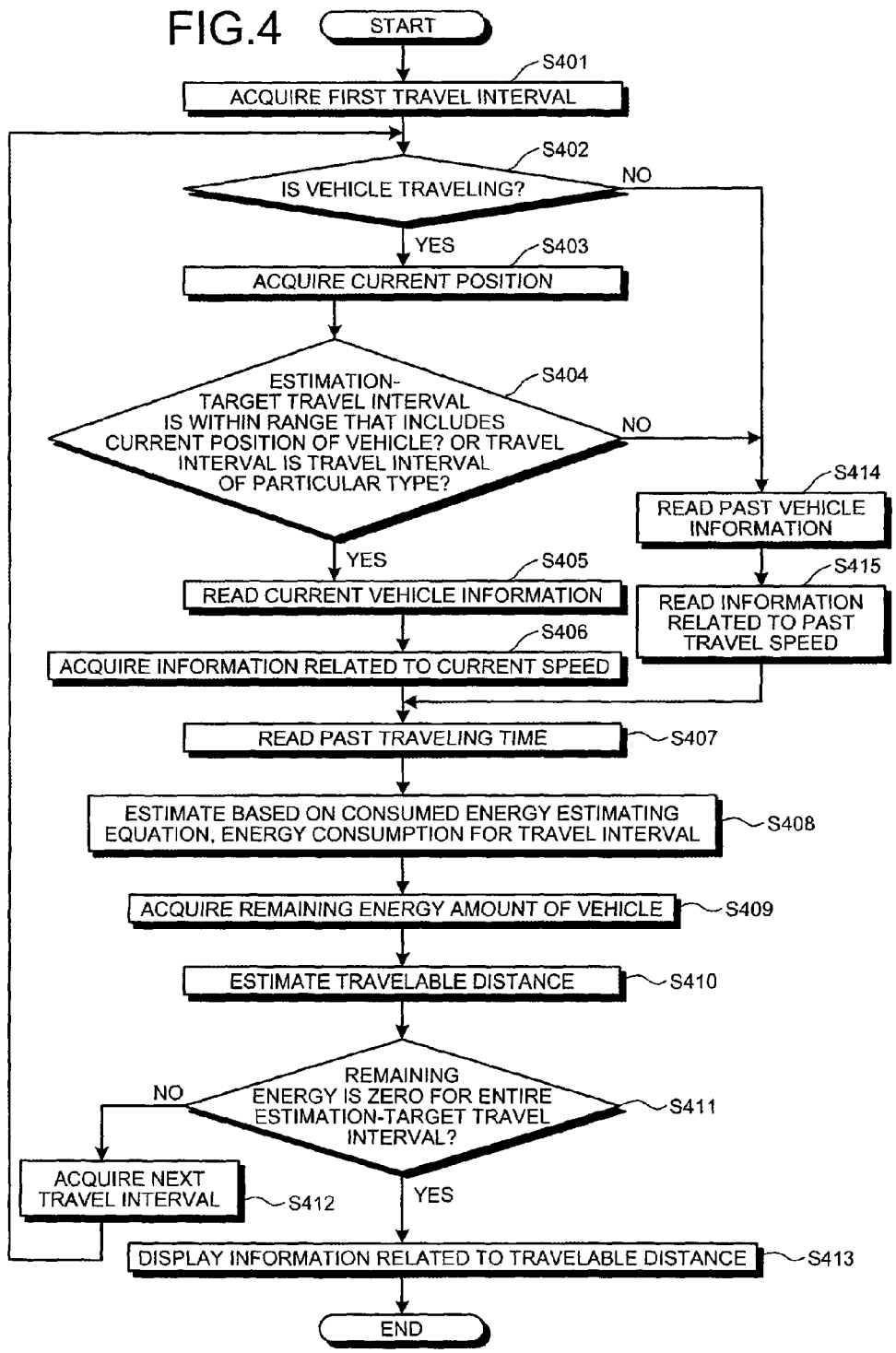

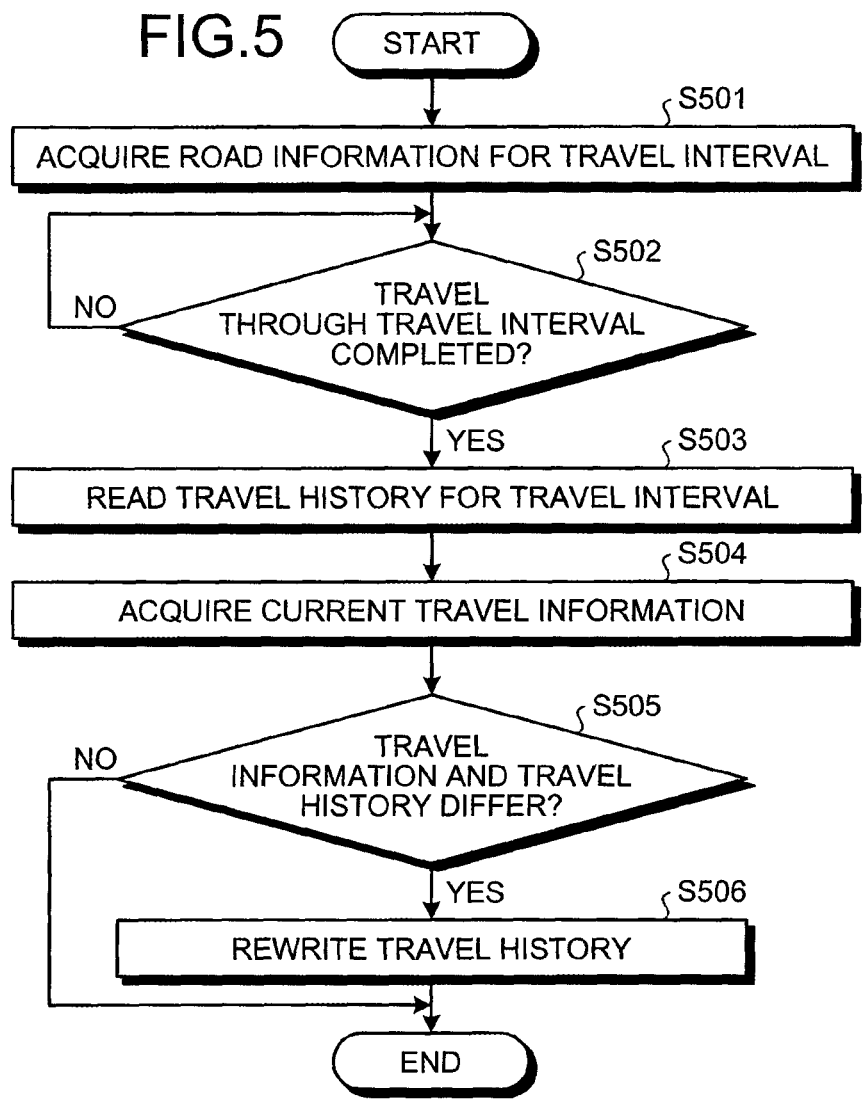

FIG.8  800

| AREA INFORMATION | ROAD TYPE | AVERAGE SPEED | AVERAGE ACCELERATION | ROAD GRADIENT |
|---|---|---|---|---|
| FIRST AREA | NATIONAL ROAD | 60 | 6.0 | 1.00↓ |
|  | EXPRESSWAY | 75 | 7.5 | 0.62↑ |
|  | GENERAL ROAD | 44 | 4.4 | 1.12↑ |
|  | NARROW STREET | 32 | 3.2 | 1.52↓ |
| SECOND AREA | NATIONAL ROAD | 59 | 5.9 | 0.40↓ |
|  | EXPRESSWAY | 76 | 7.6 | 0.20↑ |
|  | GENERAL ROAD | 45 | 4.5 | 0.88↓ |
|  | NARROW STREET | 33 | 3.3 | 0.25↓ |
| THIRD AREA | NATIONAL ROAD | 61 | 6.1 | 1.00↑ |
|  | EXPRESSWAY | 75 | 7.5 | 1.59↓ |
|  | GENERAL ROAD | 46 | 4.6 | 1.3↑ |
|  | NARROW STREET | 30 | 3.0 | 0.6↑ |

TRAVEL DISTANCE ESTIMATING APPARATUS, TRAVEL DISTANCE ESTIMATING METHOD, TRAVEL DISTANCE ESTIMATING PROGRAM, AND RECORDING MEDIUM

TECHNICAL FIELD

The present invention relate to a travel distance estimating apparatus, a travel distance estimating method, a travel distance estimating program, and a recording medium for estimating a travel distance of a moving body based on a remaining energy amount of the moving body. However, utilization of the present invention is not limited to the travel distance estimating apparatus, the travel distance estimating method, the travel distance estimating program, and the recording medium.

BACKGROUND ART

A route searching apparatus is known that searches for a route to a destination based on fuel consumption of a moving body (see, e.g., Patent Documents 1 and 2). In the Patent Document 1, to search for a route with cost minimized based on fuel consumption, fuel consumption information corresponding to a general vehicle state is corrected based on acceleration information indicating the user-selected acceleration during driving. In Patent Document 2, fuel consumption is calculated based on the distance from a departure point to a destination, legal speeds associated with map information, and gradient information and congestion information of roads to select a route having the lowest fuel consumption.

A fuel consumption estimation system is known that estimates fuel consumption of a moving body based on a travel state (see, e.g., Patent Document 3). In Patent Document 3, acceleration information similar to the current acceleration is retrieved from acceleration information of past travel history to estimate fuel consumption in a scheduled travel route based on a fuel consumption tendency obtained by using the past acceleration information.

Patent Document 1: Japanese Laid-Open Patent Publication No. 2006-300780
Patent Document 2: Japanese Laid-Open Patent Publication No. 2000-002553
Patent Document 3: Japanese Laid-Open Patent Publication No. 2009-0.31046

DISCLOSURE OF INVENTION

Problem to be Solved by the Invention

However, in the technique of Patent Document 1, a user is allowed to select from among several types of acceleration information classified by typical degrees of acceleration, acceleration information closest to the traveling state of the user and fuel consumption is calculated based on the acceleration information selected by the user. In the technique of Patent Document 2, fuel consumption is calculated based on legal speeds associated with map information. In the technique of Patent Document 3, fuel consumption is calculated based only on past acceleration information searched merely because of similarity to the current degree of acceleration.

When a vehicle actually travels on a road and, for example, the vehicle travels on a flat road, a large portion of energy consumed during acceleration is preserved as kinetic energy of forward movement and kinetic energy of a rotating mechanism of the vehicle. When the accelerator is released and the brake pedal is not pressed, the vehicle continuously travels at a decreasing speed while coasting. In this case, the kinetic energy preserved during acceleration is consumed as work for travel resistance such as friction resistance of a road surface and air resistance. Thus, for example, the techniques of the conventional documents have a problem in that it is difficult to calculate fuel consumption reflecting actual travel conditions and road conditions along a traveled road.

In the techniques of the conventional documents, fuel consumption is not calculated with consideration of vehicle information such as a gasoline vehicle, a diesel vehicle, an electric vehicle (EV), a hybrid vehicle (HV) and a plug-in hybrid vehicle (PHV) vehicle. For example, an EV vehicle uses energy recovered through regenerative control as a means of increasing travel distance. Energy necessary for acceleration is converted into and stored as kinetic energy of forward movement and kinetic energy of a rotating mechanism of the vehicle. These energies are consumed as the work for road surface resistance, air resistance, etc., and recovered as electric regenerative energy during deceleration. Energy consumption that is based on acceleration information during travel varies considerably depending on the vehicle information as described above and therefore, for example, the techniques of the conventional documents have a problem in that it is difficult to accurately calculate energy consumption when vehicle information differs.

Means for Solving Problem

To solve the problems above and achieve an object, a travel distance estimating apparatus includes an estimating unit that estimates energy consumption for a moving body to travel through a given interval (hereinafter referred to as a "travel interval"), based on a consumed energy estimating equation made up of first information related to energy consumed during stop of the moving body while a drive source in an operating state, second information related to energy consumed and recovered during acceleration/deceleration of the moving body, and third information related to energy consumed by resistance generated during travel of the moving body.

A travel distance estimating method is for a travel distance estimating apparatus that estimates energy consumption of a moving body. The travel distance estimating method includes estimating energy consumption of the moving body traveling through a given section (hereinafter referred to as a "travel interval") based on a consumed energy estimating equation made up of first information related to energy consumed during stop of the moving body with a drive source in an operating state, second information related to energy consumed and recovered during acceleration/deceleration of the moving body, and third information related to energy consumed by resistance to which the moving body is subject during travel.

A travel distance estimating program causes a computer to execute the travel distance estimating method according to claim 14.

A computer-readable recording medium stores the travel distance estimating program.

BRIEF DESCRIPTION OF DRAWINGS

FIG. 1 is a block diagram of a functional configuration of a travel distance estimating apparatus according to an embodiment;

FIG. 2 is a flowchart of a procedure of a travel distance estimating process by the travel distance estimating apparatus;

FIG. 3 is a block diagram of a hardware configuration of a navigation apparatus;

FIG. 4 is a flowchart of a procedure of the travel distance estimating process by the navigation apparatus;

FIG. 5 is a flowchart of a procedure of a correction process by the navigation apparatus;

FIG. 8 is an explanatory diagram of an example of road information in the travel distance estimating process by the navigation apparatus;

BEST MODE(S) FOR CARRYING OUT THE INVENTION

Figure 6:
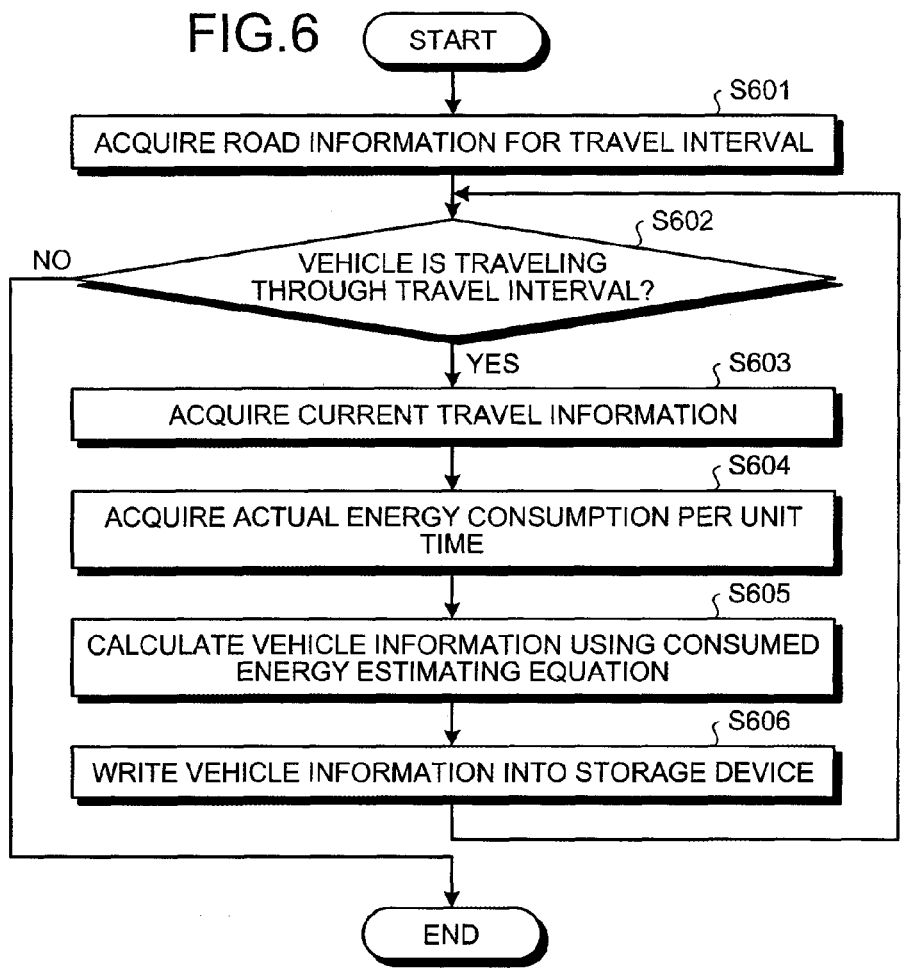
FIG. 6 is a flowchart of another procedure of the correction process by the navigation apparatus.

Preferred embodiments of a travel distance estimating apparatus, a travel distance estimating method, a travel distance estimating program, and a recording medium according to the present invention will be described in detail below with reference to the accompanying drawings.

Embodiments

FIG. 1 is a block diagram of a functional configuration of a travel distance estimating apparatus according to an embodiment. A travel distance estimating apparatus 100 according to the embodiment estimates a travel distance of a moving body based on remaining energy of the moving body. The travel distance estimating apparatus 100 includes a current position acquiring unit 101, a variable acquiring unit 102, an estimating unit 103, a correcting unit 104, and a storage unit 105.

As used herein, energy refers to, for example, energy based on electricity etc., in the case of, for example, EV vehicles, HV vehicles, and PHV vehicles (hereinafter simply referred to as "EV vehicles"). Energy also refers to, for example, energy based on gasoline, light oil, gas, etc., in the case of, for example, gasoline vehicles and diesel vehicles (hereinafter simply referred to as "gasoline vehicles"). Remaining energy refers to, for example, energy remaining in a fuel tank or a battery of a moving body and available for subsequent travel of the moving body.

The current position acquiring unit 101 acquires the current position of a moving body equipped with the travel distance estimating apparatus 100. For example, the current position acquiring unit 101 uses GPS information received from GPS satellites to calculate the current position of the apparatus, thereby acquiring positional information.

The variable acquiring unit 102 acquires information related to the speed of the moving body in a given section through which the moving body travels (hereinafter referred to as a "travel interval") and uses the information as variables in a consumed energy estimating equation. A travel interval refers to a section through which a moving body passes after the moving body starts traveling until the moving body stops and starts traveling next. For example, a travel interval is a section (hereinafter referred to as a "link (road section)") between a given point on a road (hereinafter referred to as a "node (road point)") and another node. Therefore, a node refers to a point at which the moving body stops as well as a point at which the moving body starts traveling.

A link is an element making up a road network and each link is defined between nodes. Link information includes, for example, link length (distance) data and expected data including travel speeds and average acceleration at the time and date of travel. For example, the moving body frequently stops due to traffic lights, etc. when traveling in an urban area. In this case, a node is an intersection having traffic lights, for example. A link is a section between one intersection and another intersection, for example.

A travel interval may be a section made up of one link or may be a section made up of multiple successive links. For example, in a continuous section made up of five nodes (four links), the mobile body may repeatedly start and stop four times or may complete travel through the five nodes at one time. For example, if the five nodes are intersections having traffic lights, the moving body may stop at all the intersections or the moving body may stop at no intersection. Therefore, in particular, a travel interval refers to one link made up of two nodes that the moving body may start from and stop at, or multiple successive links made up of three or more nodes that the moving body may start from and stop at. A travel interval is desirably one link made up of two nodes that the moving body may start from and stop at. This is because calculations can exhaustively be performed for all the links branching in each direction.

Information related to the speed of a moving body refers to the speed and acceleration of the moving body, for example. The consumed energy estimating equation refers to an equation for estimating energy consumption of the moving body in a travel interval. For example, the consumed energy estimating equation is a polynomial of first information, second information, and third information associated with different factors increasing and decreasing energy consumption. If a road gradient is known, fourth information is further added to the consumed energy estimating equation. Details of the consumed energy estimating equation will be described later.

The first information is information related to energy consumed during a stop of the moving body with a drive source in an operating state. A stop of the moving body with a drive source in an operating state refers to a state in which the engine is idling at low speed to the extent that no load is applied on the engine of the moving body. For example, during a stop of the moving body with the drive source in an operating state refers to idling.

For example, the first information is the amount of energy (hereinafter referred to as energy consumption) consumed while the moving body is stopped with the engine running, such as at traffic lights, etc. Therefore, the first information is the amount of energy consumed consequent to factors unrelated to the travel of the moving body. For example, the first information is the amount of energy consumed due to an air conditioner, an audio system, etc. included in the moving body. The first information may be set to substantially zero in the case of the EV vehicles.

The second information is information related to energy consumed and recovered during acceleration/deceleration of the moving body. Acceleration/deceleration of the moving body refers to a traveling state in which the speed of the moving body temporally changes. For example, acceleration/deceleration of the moving body refers to a traveling state in which the speed of the moving body changes within a given period. A given period is an interval of time having a constant length and refers to per unit time, for example.

The second information may be the ratio of energy consumption during acceleration of the moving body and energy recovery during deceleration of the moving body (hereinafter referred to as a "recovery rate") in the case of the EV vehicles. Recovered energy is energy recovered when kinetic energy generated during acceleration of the moving body is converted into electric energy during deceleration in the case of the EV vehicles. Details of the recovery rate will be described later.

Recovered energy is energy that can be conserved by not consuming more energy than necessary in the case of gasoline vehicles. For example, in the case of gasoline vehicles, a method of reducing the period that the accelerator is depressed is known as a driving method for improving fuel efficiency. Fuel consumption can be suppressed in gasoline vehicles by maintaining the travel of the moving body by kinetic energy (inertial force) generated during acceleration of the moving body. Utilization of the engine brake during deceleration of the moving body enables fuel consumption consequent to depression of the brake pedal to be suppressed. Therefore, in the case of gasoline vehicles, the fuel conserved by reducing the consumed fuel (fuel cuts) is considered as recovered energy as in the case of EV vehicles.

The third information is information related to the energy consumed by resistance generated during travel of the moving body. Travel of the moving body refers to a traveling state in which the speed of the moving body is constant within a given time. Resistance generated during travel of the moving body refers to a factor that changes the traveling state of the moving body during travel of the moving body. For example, resistance generated during travel of the moving body refers to resistance to which the moving body is subject consequent to weather conditions, road conditions, vehicle conditions, etc.

Resistance to which the moving body is subject consequent to weather conditions is, for example, air resistance due to meteorological variations such as rain and wind. Resistance to which the moving body is subject consequent to road conditions is road surface resistance due to a road gradient and the road surface. Resistance to which the moving body is subject consequent to vehicle conditions is load resistance applied to the moving body consequent to tire air pressure, the number of passengers, load weight, etc.

For example, the third information is energy consumption when the moving body travels at a constant speed while subject to air resistance, road surface resistance, and load resistance. For example, the third information is energy consumption when the moving body travels at a constant speed while subject to air resistance generated by head-on wind and road surface resistance consequent to an unpaved road, for example.

The forth information is information related to the energy consumed and recovered consequent to a change in the height of the position of the moving body. A change in the height of the position of the moving body refers to a state in which the height of the position of the moving body temporally changes. For example, a change in the height of the position of the moving body refers to a state in which the height changes because the moving body travels on a road having a gradient over a given time.

The fourth information is additional information that can be obtained when a road gradient within a given section is known and can improve accuracy of the energy consumption estimate. If the gradient of a road is unknown or if the calculation is simplified, it can be assumed that no change is made in the height of the position of the moving body, and energy consumption can be estimated by using a road gradient $\theta=0$ in the energy estimating equation described later. Description will hereinafter be made on the assumption that no change in gradient exists in a travel interval, i.e., $\theta=0$ is used (the fourth information is not taken into consideration) in the consumed energy estimating equation described later except when otherwise described and when the consumed energy estimating equation is described.

The variable acquiring unit 102 may acquire the speed and acceleration of the moving body managed by, for example, an electronic control unit (ECU), via, for example, an in-vehicle communication network operated according to a communication protocol such as a controller area network (CAN) and may use the speed and the acceleration as variables related to the first information, the second information, and the third information.

The variable acquiring unit 102 acquires, as a variable of the consumed energy estimating equation, the traveling time required for traveling through a travel interval. For example, the variable acquiring unit 102 acquires, as the traveling time, the time consumed when the moving body traveled through the same travel interval in the past.

The variable acquiring unit 102 acquires and uses information related to the remaining energy of the moving body and actual energy consumption of the moving body in a travel interval, as variables of the consumed energy estimating equation. The remaining energy is the amount of energy remaining in the fuel tank or the battery of the moving body. Therefore, the amount of recovered energy is included in the remaining energy in the case of EV vehicles. For example, the variable acquiring unit 102 acquires the remaining energy amount and the actual energy consumption managed by, for example, ECU, via, an in-vehicle communication network operated according to a communication protocol such as CAN.

If a given travel interval or a subsequent travel interval adjacent to the given travel interval is within a range that includes the current position of the moving body, or is a travel interval of a particular type, or satisfies the both conditions, the variable acquiring unit 102 acquires information related to the speed of the moving body traveling through the travel interval at this point, as a variable related to the first information, the second information, and the third information.

A given travel interval is the travel interval in which the moving body is currently traveling. A subsequent travel, interval adjacent to the given travel interval is a travel interval connected to a node of the end point of the given travel interval. For example, if a node of the end point of the given travel interval is a four-road junction, subsequent travel intervals include each of the travel intervals in the three respective directions excluding that of the given travel interval, among the four directions branching from the node of the end point of the given travel interval.

A range that includes the current position of the moving body is a range that includes the current position of the moving body when the moving body is traveling. For example, a range that includes the current position of the moving body may be, for example, a range having a given area that includes the travel interval in which the moving body is traveling, such as 10 Km2, or may be an area divided as a municipal district such as a city, a town and a village. A travel interval of a particular type is a range classified into given types. A particular type is a road type, for example.

A road type is a type of road that can be differentiated by a difference in road condition such as legal speed, road gradient, road width, and the presence of traffic signals. For example, a road type may be a national road, an expressway, a general road, a narrow street in an urban area (hereinafter referred to as a "narrow street"), etc.

Therefore, for example, the variable acquiring unit 102 acquires the actual speed and acceleration of the moving body traveling through a given travel interval as information related to speed in the given travel interval. If the given travel interval or a subsequent travel interval is within a range that includes the current position of the moving body or is a travel interval of a particular type, the variable acquiring unit 102 acquires the actual speed and acceleration of the moving body traveling through the given travel interval, as information related to speed in a subsequent travel interval. This enables the estimating unit 103 described later to estimate energy consumption close to the actual energy consumption of the moving body in a travel interval (hereinafter referred to as "actual energy consumption").

If the given travel interval or a subsequent travel interval is neither within a range that includes the current position of the moving body nor a travel interval of a particular type, the variable acquiring unit 102 acquires from travel history of the moving body, information related to the speed of the moving body when traveling the travel interval in the past (hereinafter referred to as "information related to travel speed").

The travel history of the moving body refers to the speed, acceleration, traveling time, actual energy consumption rate, vehicle information, etc. when the moving body traveled a travel interval. The vehicle information includes the vehicle weight, a weight of a vehicle rotating portion, efficiency, air resistance, etc. The travel history of the moving body is stored in the storage unit 105 for each travel interval and each road type.

For example, if the mobile body has not yet departed (is not within a given travel interval) or has not yet reached a subsequent travel interval, the variable acquiring unit 102 acquires, as the information related to travel speed, the speed and acceleration when the moving body traveled through the same travel interval or the same given range in the past. The given range refers to, for example, a distance that can be traveled before the remaining energy is exhausted, or prefectures, cities, towns and villages.

Even if the given travel interval or a subsequent travel interval is within a range that includes the current position of the moving body or is a travel interval of a particular type, the variable acquiring unit 102 may acquire the information related to travel speed. In this case, based on information related to the actual speed and information related to a past travel speed, the variable acquiring unit 102 may calculate an average, for example.

The variable acquiring unit 102 acquires and uses information related to a road in a travel interval, as a variable of the consumed energy estimating equation. For example, the variable acquiring unit 102 acquires information related to a road associated with past travel history stored in the storage unit 105. For example, the variable acquiring unit 102 may acquire information related to a road from map information stored in the storage unit 105 or may acquire a road gradient, etc. from an inclination sensor, etc.

Information related to a road is, for example, road information concerning factors that cause a change in the amount of energy consumed or recovered consequent to travel of the moving body. For example, the information related to a road is, for example, a road type or travel resistance to which the moving body is subject consequent to a road gradient, a road surface condition, etc. The travel resistance can be calculated from Equation (1), for example. The moving body is generally subject to travel resistance during travel and acceleration.

$$Rt = \mu Mg + kv^2 + Mg \sin\theta + (M+m)\alpha \quad (1)$$

where,

Rt: travel resistance v: speed

α: acceleration

μ: rolling resistance

θ: road gradient

M: weight of a moving body g: acceleration of gravity k: air resistance coefficient m: weight of a rotating body of traveling apparatus The estimating unit 103 estimates energy consumption for travel through a travel interval based on the consumed energy estimating equation made up of the first information, the second information, and the third information. For example, based on the information related to the speed of the moving body acquired by the variable acquiring unit 102, the estimating unit 103 estimates energy consumption of the moving body in a travel interval. If a road gradient is known, the estimating unit 103 may estimate energy consumption for travel through a travel interval based on the consumed energy estimating equation incorporating the fourth information.

More particularly, the estimating unit 103 estimates energy consumption per unit time based on the consumed energy estimating equation expressed as Equation (2) or Equation (3) or based on both equations. Energy consumption of the moving body during acceleration and during travel is the product of travel resistance, travel distance, net motor efficiency, and transmission efficiency and is expressed by the following Equation (2). The consumed energy estimating equation expressed as Equation (2) is a theoretical equation for estimating energy consumption per unit time during acceleration and during travel.

$$P_{t1} = P_{idle} + \frac{(\mu + \sin\theta)Mg}{\varepsilon\eta} \cdot V + \frac{\kappa}{\varepsilon\eta} V^3 + \frac{M+m}{\varepsilon\eta} |\alpha| \cdot V \quad (2)$$

where, $P_{t1}$: energy consumption per unit time (kW/sec) during acceleration and during travel $P_{idis}$: energy consumption during idling (first information)

εη: energy consumption efficiency of moving body v: speed

|α|: synthetic acceleration

β: recovery rate

In this equation, ε is net thermal efficiency and η is gross transmission efficiency. Assuming that the synthetic acceleration |α| is the sum of the acceleration α of the moving body and the acceleration g of gravity from the road gradient θ, if the synthetic acceleration |α| is negative, the consumed energy estimating equation is the product of travel resistance, travel distance, net motor efficiency, and transmission efficiency and is expressed by Equation (3). The synthetic acceleration |α| is negative when the moving body is decelerated. The consumed energy estimating equation expressed as Equation (3) is a theoretical equation for estimating energy consumption per unit time during deceleration.

$$P_{t2} = P_{idle} + \frac{(\mu - \beta \cdot \sin\theta)Mg}{\varepsilon\eta} \cdot V + \frac{\kappa}{\varepsilon\eta}V^3 - \beta \cdot \frac{M+m}{\varepsilon\eta}|\alpha| \cdot V \quad (3)$$

where,
$P_{t2}$: energy consumption per unit time (kW/sec) during deceleration

In Equations (2) and (3), the first term on the right-hand side of the equations represents energy consumption during idling (the first information); the second term on the right-hand side represents energy consumption due to a gradient component (the fourth information) and energy consumption due to a rolling resistance component (the third information); and the third term on the right-hand side represents energy consumption due to an air resistance component (the third information). The fourth term on the right-hand side of Equation (2) represents energy consumption due to an acceleration component (the second information). The fourth term on the right-hand side of Equation (3) represents energy consumption due to a deceleration component (the second information). Information represented by other variables is the same as that in Equation (1).

In Equations (2) and (3), the motor efficiency and the drive efficiency are considered constant. However, the motor efficiency and the drive efficiency actually vary depending on the effects of motor turnover and torque. Therefore, verification equations for estimating energy consumption per unit time are expressed as Equation (4) and Equation (5). A verification equation for estimating energy consumption in the case of positive synthetic acceleration $|\alpha + g \cdot \sin\theta|$ is expressed as Equation (4). Therefore, the consumed energy estimating equation expressed as Equation (4) is a verification equation for estimating energy consumption per unit time during travel and acceleration.

$$P_1 = k_1 + k_2 \cdot |\alpha + g \cdot \sin\theta| \cdot V + k_3 \cdot (V^3 + a_1 \cdot V^2 + a_2 \cdot V) \quad (4)$$

A verification equation for estimating energy consumption in the case of negative synthetic acceleration $|\alpha + g \cdot \sin\theta|$ is expressed as Equation (5). Therefore, the consumed energy estimating equation expressed as Equation (5) is a verification equation for estimating energy consumption per unit time during deceleration.

$$P_2 = k_1 - \beta \cdot k_2 \cdot |\alpha + g \cdot \sin\theta| \cdot V + k_3 \cdot (V^3 + a_1 \cdot V^2 + a_2 \cdot V) \quad (5)$$

In Equations (4) and (5), coefficients a1 and a2 are constants set depending on the state of the moving body. Coefficients k1, k2, and k3 are variables based on energy consumption during acceleration. Information represented by the first term on the right-hand side of the equations to the fourth term on the right-hand side equations is the same as that in Equations (2) and (3).

Equation (2), i.e., a theoretical equation, and Equation (4), i.e., a verification equation, have similar structures. The first terms on the right-hands of both Equations (2) and (4) are components independent of speed and are the first information. A second term on the right-hand side of Equation (4) represents energy consumption for gradient resistance and acceleration resistance. Therefore, the second term on the right-hand side of Equation (4) represents the second information indicating the amount of increase in kinetic energy due to an increase in speed and further represents the fourth information indicating the amount of increase in positional energy due to a change in height. The second term on the right-hand side of Equation (4) corresponds to the acceleration component of the fourth term on the right-hand side of Equation (2) and the gradient component of the second term on the right-hand side of Equation (2). The third term on the right-hand side of Equation (4) represents the third information and corresponds to the rolling resistance component of the second term on the right-hand side of Equation (2) and the air resistance component of the third term on the right-hand side of Equation (2).

Equation (3), i.e., a theoretical equation, and Equation (5), i.e., a verification equation, have similar structures as is the case with the relationship between Equation (2) and Equation (4). $\beta$ of the second term on the right-hand side of Equation (5) is the recovered portion (hereinafter referred to as a "recovery rate") of the positional energy and the kinetic energy.

The estimating unit 103 may use the consumed energy estimating equation expressed as Equation (4) or Equation (5) or both equations and input the traveling speed V and the traveling acceleration $\alpha$ for each unit time to estimate consumed energy at the moment of acquisition of the traveling speed and the traveling acceleration. However, when a travelable range is estimated by using Equation (4) or Equation (5), if it is attempted to acquire the speed and acceleration for each unit time of 1 second, for example, to estimate energy consumption every second over the distance of all the travel intervals through which the moving body will travel, the calculation amount may be enormous.

Therefore, the estimating unit 130 may use an average value of traveling speed and an average value of traveling acceleration in a somewhat integrated section to estimate energy consumption in the section. This somewhat integrated section is a section through which the moving body travel and may be a travel interval, for example. Energy consumption in a section can be acquired by using a consumed energy estimating equation defined based on Equation (4) or Equation (5). For example, the estimating unit 130 uses an estimating equation that averages the amount of energy consumed per unit time during acceleration of the moving body and the amount of energy recovered per unit time during deceleration of the moving body as the second information.

For example, the estimating unit 130 may use a verification equation for energy consumption in a section, such as Equation (6) or Equation (7) or both equations to estimate energy consumption.

The consumed energy estimating equation expressed as Equation (6) is an equation of estimating energy consumed in a section when a height difference $\Delta h$ is positive in the section through which the moving body travels. When the height difference $\Delta h$ is positive, the moving body is traveling on an ascending slope.

$$P = \frac{P_1 + P_2}{2} \quad (6)$$
$$= k_1 + (1-\beta) \cdot \frac{k_2}{2} \cdot \overline{|\alpha|} \cdot \overline{V} + k_2 \cdot g \cdot \Delta h +$$
$$k_3 \cdot (\overline{V}^3 + a_1 \cdot \overline{V}^2 + a_2 \cdot \overline{V})$$

Meanwhile, the consumed energy estimating equation expressed as Equation (7) is an equation of estimating the energy consumed in a section when the height difference $\Delta h$ is negative in the section through which the moving body travels. When the height difference $\Delta h$ is negative, the moving body is traveling on a descending slope.

$$P = \frac{P_1 + P_2}{2} \quad (7)$$

$$= k_1 + (1-\beta) \cdot \frac{k_2}{2} \cdot |\overline{\alpha}| \cdot \overline{V} + \beta \cdot k_2 \cdot g \cdot \Delta h +$$

$$k_3 \cdot (\overline{V}^3 + a_1 \cdot \overline{V}^2 + a_2 \cdot \overline{V})$$

In Equations (6) and (7), the first term on the right-hand side represents energy consumption during idling (the first information); the second term on the right-hand side represents energy consumption due to acceleration resistance (the second information); the third term on the right-hand side represents energy consumption consumed as positional energy (the fourth information); and the fourth term on the right-hand side represents energy consumption due to air resistance and rolling resistance (hereinafter collectively referred to as travel resistance) to which the moving body is subject per unit area (the third information).

The estimating unit 130 may acquire the recovery rate β provided by the manufacturer or may calculate the recovery rate β based on information related to the speed acquired by the variable acquiring unit 102.

A calculation method of the recovery rate β will be described. Assuming that the second term on the right-hand side in Equation (6) is energy consumption Pacc of an acceleration component in a travel interval, the energy consumption Pacc of the acceleration component is acquired by subtracting the energy consumed during idling (the first term on the right-hand side) and the energy consumed due to travel resistance (the fourth term on the right-hand side), from the total energy consumed in the travel interval (the left-hand side) and is expressed by Equation (8).

$$P_{acc} = P - k_1 - k_3 \cdot (\overline{V}^3 + a_1 \cdot \overline{V}^2 + a_2 \cdot \overline{V}) \quad (8)$$

In Equation (8), it is assumed that the moving body is not affected by the road gradient θ (θ=0). Therefore, the third term on the right-hand side of Equation (6) is set to zero. A calculation equation of the recovery rate β expressed as Equation (9) can be acquired by substituting Equation (8) into Equation (6).

$$\beta = 1 - \frac{2 \cdot P_{acc}}{k_2 \cdot |\overline{\alpha}| \cdot \overline{V}} \quad (9)$$

The recovery rate β is about 0.7 to 0.9 in EV vehicles, about 0.6 to 0.8 in HV vehicles, and 0.2 to 0.3 in gasoline vehicles. The recovery rate of the gasoline vehicles is a ratio of the energy consumed during acceleration of the moving body and the energy subjected to fuel cut during deceleration.

The estimating unit 103 estimates energy consumption per unit time for travel through a travel interval based on one or more equations of the consumed energy estimating equations expressed as Equations (2) to (5) and multiplies the energy consumption by a traveling time to estimate energy consumption for travel through the travel interval.

For example, the estimating unit 103 uses information related to the actual speed or information related to the travel speed to estimate energy consumption per unit time based on the consumed energy estimating equations and multiplies the energy consumption by a traveling time acquired by the variable acquiring unit 102 to estimate energy consumption in the travel interval. Since energy consumption for a travel interval is estimated by using a traveling time for the moving body to actually travel through the travel interval in the past, energy consumption closer to the actual energy consumption can be estimated.

The estimating unit 103 uses the amount of remaining energy as a solution of a consumed energy estimating equation to estimate a point at which the remaining energy is exhausted and calculates a travelable distance of the moving body. For example, the estimating unit 103 estimates a point at which the remaining energy is exhausted and calculates a travelable distance of the moving body based on the energy consumption estimated based on the consumed energy estimating equations expressed as Equations (2) to (7) and the remaining energy amount acquired by the variable acquiring unit 102.

For example, the estimating unit 103 repeats a process of estimating energy consumption for travel through a given travel interval of successive travel intervals and of subsequently estimating energy consumption for travel from the current position of the moving body through another travel interval adjacent to the given travel, interval until the remaining energy is exhausted and thereby, estimates a point at which the remaining energy is exhausted.

The correcting unit 104 corrects based on the actual energy consumption acquired by the variable acquiring unit 102, information related to the moving body and used as a variable of a consumed energy estimating equation. For example, the correcting unit 104 corrects based on the actual energy consumption acquired by the variable acquiring unit 102, an actual speed at a time point of measurement of the actual energy consumption, actual acceleration, information related to a road, etc., the information that is related to the moving body and used as a variable of a consumed energy estimating equation.

The information related to the moving body is information concerning a factor that causes a change in the amount of energy consumed or recovered due to travel of the moving body. For example, the information related to the moving body is, for example, information related to the moving body itself such as a maintenance state included in the vehicle information, and information related to travel by the moving body such as the surface condition of a road and information related to speed changes with respect to speeds indicated in the past travel history.

The correcting unit 104 may compare the past travel history and the current travel state for a travel interval to correct information related to the moving body, if the past travel history and the current travel state are different from each other. The correction of the information related to the moving body by the correcting unit 104 enables the current information related to the moving body to be reflected on the consumed energy estimating equations each time the moving body travels through a travel interval or a given range.

For example, the correcting unit 104 corrects based on the actual energy consumption and the information related to speed acquired by the variable acquiring unit 102, the information that is related to the moving body and used as variables of the consumed energy estimating equations. For example, based on the actual energy consumption, speed, acceleration, and gradient of the moving body acquired each second by the variable acquiring unit 102, the correcting unit 104 calculates the first information Pidle, the efficiency εη, the weight M of the moving body, etc., each second by using the consumed energy estimating equations expressed as Equations (4) and (5) with a multi-regression analysis method and a regression analysis method.

The storage unit 105 stores map information sectionalized into given ranges and type information of each travel interval.

For example, the storage unit 105 stores the travel history of the moving body, information related to road associated with the travel history of the moving body, map information, etc., for each travel interval, each road type, and each given range. The storage unit 105 may store the energy consumption, a recovery rate β, a travelable distance, etc., estimated by the estimating unit 103. The storage unit 105 may store information related to the moving body, for correlating variables used in the consumed energy estimating equations expressed as Equations (2) to (7) and calculated by the correcting unit 104.

A display unit 110 displays the information estimated by the estimating unit 103 along with map data. For example, the display unit 110 displays map data that includes the information related to the travelable distance calculated by the estimating unit 103. For example, the display unit 110 displays a reachable route, area, etc., within the travelable distance calculated by the estimating unit 103 on the map data.

A travel distance estimating process by the travel distance estimating apparatus 100 will be described. FIG. 2 is a flowchart of a procedure of the travel distance estimating process by the travel distance estimating apparatus. In the flowchart of FIG. 2, the travel distance estimating apparatus 100 uses the variable acquiring unit 102 to acquire information related to a road in a travel interval through which the moving body travels (step S201). The travel distance estimating apparatus 100 uses the variable acquiring unit 102 to acquire information related to speed of the moving body in the travel interval (step S202).

The travel distance estimating apparatus 100 uses the estimating unit 103 to estimate energy consumption for travel through the travel, interval by using the consumed energy estimating equation made up of the first information, the second information, and the third information based on the information related to speed of the moving body in the travel interval (step S203).

The travel distance estimating apparatus 100 uses the variable acquiring unit 102 to acquire the amount of remaining energy of the moving body (step S204). Based on the remaining energy amount, the travel distance estimating apparatus 100 estimates a travelable distance of the moving body to estimate a travelable range of the moving body (step S205), and terminates the process of the flowchart.

As described, the travel distance estimating apparatus 100 according to the embodiment estimates energy consumption for a travel interval by using the consumed energy estimating equation made up of the first information, the second information, and the third information. More particularly, the travel distance estimating apparatus 100 estimates energy consumption for a travel interval by using the consumed energy estimating equation based on the energy consumed in the idling state of the moving body, during acceleration/deceleration, and during travel, and the energy recovered during acceleration/deceleration of the moving body. Since the travel distance estimating apparatus 100 calculates and estimates energy consumption for respective travel states having different amount of energy consumption, energy consumption can be estimated more accurately.

The travel distance estimating apparatus 100 estimates energy consumption for a travel interval based on information related to the speed of the moving body. Therefore, the travel, distance estimating apparatus 100 can estimate energy consumption reflecting the actual travel state in the travel interval.

The travel distance estimating apparatus 100 estimates a travelable range of the moving body based on the remaining energy amount acquired from the moving body. Therefore, the travel distance estimating apparatus 100 can predict to which point, the moving body can travel with the current remaining energy amount or through which route, the moving body can travel and reach the destination with the current remaining energy amount.

The consumed energy estimating equations expressed as Equations (1) to (9) include vehicle information and road information as variables. Therefore, the travel distance estimating apparatus 100 can estimate energy consumption and a travelable distance reflecting the actual state of the moving body and the actual road conditions in the travel interval.

EXAMPLES

An example of the present invention will hereinafter be described. In this example, an example of application of the present invention will be described when a navigation apparatus 300 equipped on a vehicle is used as the travel distance estimating apparatus 100.

(Hardware Configuration of Navigation Apparatus 300)

A hardware configuration of a navigation apparatus 300 will be described. FIG. 3 is a block diagram of a hardware configuration of the navigation apparatus 300. As depicted in FIG. 3, the navigation apparatus 300 includes a CPU 301, a ROM 302, a PAM 303, a magnetic disk drive 304, a magnetic disk 305, an optical disk drive 306, an optical disk 307, an audio interface (I/F) 308, a microphone 309, a speaker 310, an input device 311, a video I/F 312, a display 313, a camera 314, a communication I/F 315, a GPS unit 316, and various sensors 317, respectively connected through a bus 320.

The CPU 301 governs overall control of the navigation apparatus 300. The ROM 302 stores therein various programs such as a boot program, a travel distance estimating program, a data updating program, a map data display program, etc. The RAM 303 is used a work area of the CPU 301, i.e., the CPU 301 while using the RAM 303 as a work area, by executing various programs stored in the ROM 302, governs overall control of the navigation apparatus 300.

The magnetic disk drive 304 controls the reading and the writing of data with respect to the magnetic disk 305, under the control of the CPU 301. The magnetic disk 305 records data written thereto under the control of the magnetic disk drive 304. As the magnetic disk 305, for example, a hard disk (HD), a flexible disk (FD), etc. may be used.

The optical disk drive 306 controls the reading and the writing of data with respect to the optical disk 307, under the control of the CPU 301. The optical disk 307 is a removable recording medium from which data is read under the control of the optical disk drive 306. The optical disk 307 may be a writable recording medium. As the removal recording medium, a medium other than the optical disk 307 can be employed, such as an MO and a memory card.

One example of information stored on the magnetic disk 305 and the optical, disk 307 may be map data, vehicle information, road information, a travel history, etc. Map data is used when a travelable distance is displayed in the navigation system and includes background data indicative of terrestrial objects (features) such as buildings, rivers, and ground surfaces, and road-shape data indicative of the shapes of roads. In this example, the road information and the travel history is road related data used as variables in the consumed energy estimating equation expressed as equations (2) to (7) above.

The audio I/F 308 is connected with the microphone 309 for audio input and the speaker 310 for audio output. Sound received by the microphone 309 is subjected to A/D conversion at the audio I/F 308. The microphone 309 may be provided on the dashboard of the vehicle and in plural or singularly. The speaker 310 outputs sound subjected to A/D conversion at the audio I/F 308.

The input device 311 may be, for example, a remote controller, a keyboard, or a touch panel having keys used to input characters, numerical values, or various kinds of instructions. Further, the input device 311 may be implemented by any one, or more, of the remote controller, the keyboard, and the touch panel.

The video I/F 312 is connected to the display 313. The video I/F 312 is made up of, for example, a graphic controller that controls the display 313, a buffer memory such as VRAM (Video RAM) that temporarily stores immediately displayable image information, and a control IC that controls the display 313 based on image data output from the graphic controller.

The display 313 displays icons, a cursor, menus, windows, or various data such as text and images. A TFT liquid crystal display, an organic EL display and so on may be employed as the display 313.

The camera 317 captures images inside and outside the vehicle. The images may be still images or moving images. For example, images outside the vehicle captured by the camera 317 are analyzed at the CPU 301 and output through the video I/F 312 to a recording medium such as the magnetic disk 305 and the optical disk 307.

The communication I/F 315 wirelessly connected to a network and functions as an interface between the navigation apparatus 300 and the CPU 301. Communication networks functioning as the network include public communication line networks and cellular telephone networks, dedicated short range communication (DSRC), LANs and WANs. The communication I/F 315 is, for example, a module for connecting to public lines, a non-stop, automatic payment system (ETC) unit, an FM tuner, a Vehicle Information and Communication System (VICS)/beacon receiver, etc.

The GPS unit 316 receives signals from GPS satellites and outputs information indicating the position of the vehicle. The information output by the GPS unit 316 is used together with values output from the various sensors 317, described hereinafter, in the calculation of the current position of the vehicle, by the CPU 301. Information indicative of current position includes, for example, information indicating one point on map information, such as latitude, longitude, altitude, etc.

The various sensors 317 include a vehicular speed sensor, an acceleration sensor, and an angular speed sensor that respectively output information used to determine the position and behavior of the vehicle. Values output from the various sensors 317 are used by the CPU 301 to compute the current position and measure changes in speed, direction, etc.

Functions of the current position acquiring unit 101, the variable acquiring unit 102, the estimating unit 103, the correcting unit 104, and the storage unit 105 of the travel distance estimating apparatus depicted in FIG. 1 are implemented by using programs and data stored on the ROM 302, the RAM 303, the magnetic disk 305, the optical disk 307, etc. in the navigation apparatus 300, to execute a given program on the CPU 301 and control the components of the navigation apparatus 300.

(Overview of Consumed Energy Estimation by Navigation Apparatus 300)

The navigation apparatus 300 of the present example estimates the energy consumed during travel of the vehicle equipped with the navigation apparatus 300. For example, the navigation apparatus 300 estimates the energy consumption of the vehicle by using any one or more of the consumed energy estimating equations expressed as Equations (2) to (7) based on the speed, acceleration, and gradient of the vehicle, for example.

$$P_{t1} = P_{idle} + \frac{(\mu + \sin\theta)Mg}{\varepsilon\eta} \cdot V + \frac{\kappa}{\varepsilon\eta}V^3 + \frac{M+m}{\varepsilon\eta}|\alpha| \cdot V \quad (2)$$

where
$P_{t1}$: energy consumption per unit time (kW/sec) during acceleration and during travel.
$P_{idis}$: energy consumption during idling (first information)
$\mu$: rolling resistance
$\theta$: road gradient
M: weight of moving body
g: acceleration of gravity
$\varepsilon\eta$: energy consumption efficiency of moving body
k: air resistance coefficient
v: speed
$|\alpha|$: synthetic acceleration
$\beta$: recovery rate
m: weight of a rotating body of traveling apparatus $$P_{t2} = P_{idle} + \frac{(\mu - \beta \cdot \sin\theta)Mg}{\varepsilon\eta} \cdot V + \frac{\kappa}{\varepsilon\eta}V^3 - \beta \cdot \frac{M+m}{\varepsilon\eta}|\alpha| \cdot V \quad (3)$$

where
$P_{t2}$: energy consumption per unit time (kW/sec) during deceleration.

The consumed energy estimating equation expressed as Equation (2) is a theoretical equation for estimating energy consumed per unit time during acceleration and during travel. The consumed energy estimating equation expressed as Equation (3) is a theoretical equation for estimating energy consumed per unit time during deceleration.

In Equations (2) and (3), the first term on the right-hand side represents energy consumption during idling (the first information); the second term on the right-hand side represents energy consumption due to a gradient component (the fourth information) and energy consumption due to a rolling resistance component (the third information); and the third term on the right-hand side represents energy consumption due to an air resistance component (the third information). The fourth term on the right-hand side of Equation (2) represents energy consumption due to an acceleration component (the second information). The fourth term on the right-hand side of Equation (3) represents energy consumption due to a deceleration component (the second information).

$$P_1 = k_1 + k_2 \cdot |\alpha + g \cdot \sin\theta| \cdot V + k_3 \cdot (V^3 + a_1 \cdot V^2 + a_2 \cdot V) \quad (4)$$

$$P_2 = k_1 - \beta \cdot k_2 \cdot |\alpha + g \cdot \sin\theta| \times V + k_3 \cdot (V^3 + a_1 \cdot V^2 + a_2 \cdot V) \quad (5)$$

The consumed energy estimating equation expressed as Equation (4) is a verification equation for estimating energy consumption per unit time during acceleration and during travel. The consumed energy estimating equation expressed as Equation (5) is a verification equation for estimating energy consumption per unit time during deceleration.

In Equations (4) and (5), coefficients a1 and a2 are constants set depending on the vehicle state. Coefficients k1, k2, and k3 are variables based on energy consumption during acceleration. The speed V and the acceleration A are used, and other variables and information represented by portions corresponding to the first term on the right-hand side to the fourth term on the right-hand side are the same as those in Equations (2) and (3).

The navigation apparatus 300 may use the average speed and average acceleration of the vehicle in a somewhat integrated section to estimate energy consumption in a section through which the vehicle travels, based on the consumed energy estimating equation expressed as Equations (6) or (7).

$$P = \frac{P_1 + P_2}{2} \qquad (6)$$
$$= k_1 + (1 - \beta) \cdot \frac{k_2}{2} \cdot |\overline{\alpha}| \cdot \overline{V} + k_2 \cdot g \cdot \Delta h +$$
$$k_3 \cdot \left(\overline{V}^3 + a_1 \cdot \overline{V}^2 + a_2 \cdot \overline{V}\right)$$

$$P = \frac{P_1 + P_2}{2} \qquad (7)$$
$$= k_1 + (1 - \beta) \cdot \frac{k_2}{2} \cdot |\overline{\alpha}| \cdot \overline{V} + \beta \cdot k_2 \cdot g \cdot \Delta h +$$
$$k_3 \cdot \left(\overline{V}^3 + a_1 \cdot \overline{V}^2 + a_2 \cdot \overline{V}\right)$$

The consumed energy estimating equation expressed as Equation (6) is a theoretical equation for estimating energy consumption in a section when a height difference $\Delta h$ is positive in the section through which the moving body travels. The consumed energy estimating equation expressed as Equation (7) is a theoretical equation for estimating energy consumption in a section when the height difference $\Delta h$ is negative in the section through which the moving body travels. If no height difference exists, the consumed energy estimating equation expressed as Equation (6) is preferably used.

In Equations (6) and (7), the first term on the right-hand side represents energy consumption during idling (the first information); the second term on the right-hand side represents energy consumption due to acceleration resistance (the second information); the third term on the right-hand side represents the amount of energy consumed as positional energy (the fourth information); and the fourth term on the right-hand side represents energy consumption due to air resistance and rolling resistance (travel resistance) to which the vehicle is subject per unit area (the third information).

The navigation apparatus 300 may calculate the first information Pidle, the efficiency $\epsilon\eta$, the weight M of the moving body, etc., each second by using the consumed energy estimating equation expressed as Equation (4) or (5), or the both equations, with a multi-regression analysis method and a regression analysis method to correct the variables of the consumed energy estimating equations expressed as Equation (2) to (7).

(Travel Distance Estimating Process in Navigation Apparatus 300)

As described above, the navigation apparatus 300 acquires a travel interval and information related to the speed of the vehicle in the travel interval and estimates energy consumption in the travel interval by using the consumed energy estimating equations. The navigation apparatus 300, by using the consumed energy estimating equations, acquires the remaining amount of energy of the vehicle and estimates a travelable distance of the vehicle. Details of a traveling distance estimating process will hereinafter be described.

FIG. 4 is a flowchart of a procedure of the travel distance estimating process by the navigation apparatus. In the flowchart of FIG. 4, first, for example, based on the current position of the vehicle preliminarily acquired, the navigation apparatus 300 acquires a travel, interval that includes the current position, as a first energy consumption estimation-target travel interval (hereinafter simply referred to as an estimation-target travel interval) (step S401). The navigation apparatus 300 determines, for example, through a vehicle speed sensor and an acceleration sensor, whether the vehicle equipped with the navigation apparatus 300 is traveling (step S402).

If the vehicle is traveling (step S402: YES), the navigation apparatus 300 acquires the current position of the vehicle through the communication I/F 315 (step S403). In this example, the navigation apparatus 300 acquires road information of the travel interval along with the current position of the vehicle. The road information may include weather, wind direction, and wind speed in the travel interval, for example.

The navigation apparatus 300 determines whether the travel interval acquired at step S401 is within a range that includes the current position of the vehicle or whether the travel interval is a travel interval of a particular type (step S404). As described later, if multiple estimation-target travel intervals exist, the determination is made for each of the travel intervals and the subsequent process is independently executed for each of the travel intervals. If the travel interval is within the range described at step S404 (step S404: YES), the navigation apparatus 300 reads current vehicle information from a storage device (the magnetic disk 305 or the optical disk 307) (step S405). The vehicle information may be information provided from a manufacturer at the time of factory shipment or may be information corrected by a correction process described later.

The navigation apparatus 300 acquires information related to the current speed through the vehicle speed sensor and the acceleration sensor, for example (step S406). The information related to speed is the speed, acceleration, etc. of the vehicle. The navigation apparatus 300 reads from travel history recorded in the storage device described later, a traveling time consumed in the past by the vehicle to travel through the travel interval acquired at step S401 (step S407).

The navigation apparatus 300 uses the vehicle information read at step S405 and the information related to speed acquired at step S406 to estimate energy consumption in the travel interval acquired at step S401, based on any one or more of the consumed energy estimating equations described as Equations (2) to (7) (step S408). If energy consumption per unit time is estimated, the navigation apparatus 300 multiplies the energy consumption per unit time in the travel interval by the past traveling time to estimate the energy consumption in the travel interval.

The navigation apparatus 300 acquires the remaining energy amount of the vehicle through the in-vehicle communication network (step S409). The navigation apparatus 300 subtracts the amount of energy consumed in the estimation-target travel interval from the remaining energy amount acquired at step S409 to estimate a travelable distance of the vehicle (step S410). Therefore, if remaining energy still remains, the navigation apparatus 300 estimates that the vehicle can travel through the estimation-target travel interval with the current remaining energy amount.

The navigation apparatus 300 determines whether the remaining energy is zero for the entire estimation-target travel interval (step S411). If the remaining energy is not zero for the entire estimation-target travel interval, the vehicle may further travel through a subsequent travel interval connected to the estimation-target travel interval If the remaining energy is not zero for the entire estimation-target travel interval (step S411: NO), the navigation apparatus 300 acquires the next travel interval adjacent to the estimation-target travel interval for which the remaining energy is zero (step S412). If multiple travel intervals are adjacent to the estimation-target travel interval, for example, because of an intersection, all the travel intervals are acquired as estimation-target travel intervals. The navigation apparatus 300 returns to step S402 to determine whether the vehicle is traveling, and then repeatedly executes the subsequent process.

On the other hand, if the remaining energy is zero for the entire travel interval (step S411: YES), the navigation apparatus 300 displays information related to the travelable distance (step S413) along with map data displayed on the display 313, for example, and terminates the process of this flowchart. The information related to the travelable distance is image information for displaying a travelable range of the vehicle on a map, text information for displaying the travelable range as text, etc.

If the vehicle is not traveling (step S402: NO) or if the travel interval is not within the range described at step S404 (step S404: NO), the navigation apparatus 300 reads past vehicle information from the storage device (step S414). The navigation apparatus 300 reads from the storage device, information related to a past travel speed (step S415) and goes to step S407 to execute the subsequent process.

Information related to a past vehicle information and travel speed is information acquired by the navigation apparatus 300 and stored in the storage device when in the past, the vehicle traveled through the travel interval acquired at step S401 or step S412. If the vehicle is not traveling, the vehicle is not yet started, for example. For the information related to past vehicle information and travel speed, the navigation apparatus 300 may use information of past travel of another vehicle collected by a server if the navigation apparatus 300 is connectable to a communication system via the server, instead of the information stored in the past at the time of travel of the vehicle. The navigation apparatus 300 may use information related to travel speed and vehicle information corresponding to each travel interval recorded in the storage device in advance. For example, the information may be statistical information stored in the storage device in advance at the time of manufacturing of the navigation apparatus 300.

In the travel distance estimating process, the navigation apparatus 300 can sequentially estimate energy consumption in another travel interval starting from the travel interval in which the vehicle is currently located, not only during stop of the vehicle but also during travel of the vehicle so as to estimate, for example, to which point the vehicle can travel with the currently remaining energy amount.

If a route to a destination is already determined, the navigation apparatus 300 may sequentially acquire travel intervals on the route and accumulate the amount of energy consumption. If a routed to a destination is searched for, the navigation apparatus 300 may accumulate the amount of energy consumption for multiple candidate routes to the destination to estimate, for example, through which route, the vehicle can travel and reach the destination with the currently remaining energy amount or the routes through which the vehicle cannot reach the destination with the currently remaining energy amount.

If the remaining energy amount becomes zero for the entire travel interval at step S410, for example, the navigation apparatus 300 may go to step S413 and notify the user of a route to an EV-vehicle charging station, a gas station, etc., reachable with the remaining energy amount. Data acquired by the navigation apparatus 300 during the travel distance estimating process is recorded into the storage device as travel history.

(Correction Process in Navigation Apparatus 300: Part 1)

Description will be made of a correction process of travel history used as a variable of the consumed energy estimation equation in the travel distance estimating process in the navigation apparatus 300. FIG. 5 is a flowchart of a procedure of the correction process by the navigation apparatus. In the flowchart of FIG. 5, description will be made of a case where the travel history is corrected after travel through a travel interval is completed.

In the flowchart of FIG. 5, the navigation apparatus 300 acquires road information for the travel, interval via the communication I/F 315 (step S501). When the operation at step S403 of the travel distance estimating process (see FIG. 4) is executed, the navigation apparatus 300 may execute the operation at step S501 and execute the subsequent operation.

The navigation apparatus 300 waits for the vehicle to completely travel through the travel interval (step S502: NO). After the vehicle completely travels through the travel interval (step S502: YES), the navigation apparatus 300 reads the travel history stored in the storage device (the magnetic disk 305 or the optical disk 307) (step S503).

The information read from the travel history by the navigation apparatus 300 is the travel history for the travel interval through which the vehicle has just completely traveled at step S502. For example, the information read from the travel history by the navigation apparatus 300 is information used as variables in the consumed energy estimating equations and includes speed, acceleration, average speed, and average acceleration.

The navigation apparatus 300 acquires the travel information for the travel interval through which the vehicle has just completely travel at step S502 during travel at this time via the in-vehicle communication network, for example (step S504). The travel information acquired by the navigation apparatus 300 is information that is compared with the travel history read from the storage device at step 503 by the navigation apparatus 300 and includes speed, acceleration, average speed, and average acceleration, for example.

The navigation apparatus 300 compares the travel information acquired at step S504 with the travel history read at step S503 to determine whether the travel information is different from the travel history (step S505), whereby it is determined whether travel of the vehicle in the travel interval at this time is different from past travel in the same travel interval.

If the travel information is different from the travel history (step S505: YES), the navigation apparatus 300 rewrites the travel history stored in the storage device with the current travel information (step S506) and terminates the process of this flowchart. If the travel information is not different from the travel history (step S505: NO), the navigation apparatus 300 terminates this flowchart without rewriting the travel history.

In the correction process depicted in FIG. 5, after waiting for the vehicle to completely travel through the given range at step S502, the navigation apparatus 300 may execute the subsequent operation. In this case, the navigation apparatus 300 may read the past travel history for the given range at step S503 and acquire travel information for the given range through which the vehicle has just completely traveled at step S504.

(Correction Process in Navigation Apparatus 300: Part 2)

FIG. 6 is a flowchart of another procedure of the correction process by the navigation apparatus. In the flowchart of FIG. 6, description will be made of a case where the travel, history is corrected during travel through a travel interval. For example, the correction process depicted in FIG. 6 may be executed concurrently with steps S403 to S410 of the travel distance estimating process depicted in FIG. 4.

In the flowchart of FIG. 6, the navigation apparatus 300 acquires road information for the travel, interval via the communication I/F 315 (step S601). When the operation at step S403 of the travel distance estimating process (see FIG. 4) is executed, the navigation apparatus 300 may execute the operation at step S601 to successively execute the subsequent operation.

The navigation apparatus 300 determines whether the vehicle is traveling through the travel interval, based on, for example, the current position of the vehicle acquired via the communication I/F 315 (step S602). If the vehicle is traveling through the travel interval (step S602: YES), the navigation apparatus 300 acquires current travel information through the in-vehicle communication network (step S603). In this case, the current travel information includes the speed and acceleration per unit time, for example.

The navigation apparatus 300 acquires the actual energy consumption per unit time corresponding to the travel information acquired at step S603 via the in-vehicle communication network such as CAN (step S604). The navigation apparatus 300 calculates vehicle information, etc. by using the consumed energy estimating equation described as Equation (4) or Equation (5), or both equations, based on the travel information acquired at step S603 and the actual energy consumption per unit time acquired at step S604 (step S605).

The vehicle information calculated at step S605 is the vehicle information used as variables in the consumed energy estimating equations described as Equation (2) to (7). For example, the vehicle information calculated at step S605 is the efficiency $\epsilon\eta$, the energy Pidle consumed during idling (first information), the weight M of the moving body, etc. Therefore, the navigation apparatus 300 determines variables used as the variables of the consumed energy estimating equations described as Equation (2) to (7) based on the current speed and acceleration and the actual energy consumption per unit time.

The navigation apparatus 300 writes the vehicle information calculated at step S605 into the storage device (step S606) and returns to step S602. The navigation apparatus 300 continues executing the operations at steps S602 to S606 while the vehicle is traveling through the travel interval. On the other hand, if the vehicle has traveled completely through the travel interval (step S602: NO), the process of this flowchart is terminated.

For example, the navigation apparatus 300 repeatedly executes the correction process depicted in FIGS. 5 and 6 each time the current position of the vehicle is acquired (step S403).

As described above, the navigation apparatus 300 can correct based on the travel information of the vehicle, information related to the speed and used as variables in the consumed energy estimating equations. The navigation apparatus 300 can correct based on the travel information and travel history of the vehicle, the vehicle information used as variables in the consumed energy estimating equations. As a result, the energy consumption for the travel interval can be estimated more accurately and the travelable range of the vehicle can be estimated more accurately.

(Road Gradient)

Figure 7:
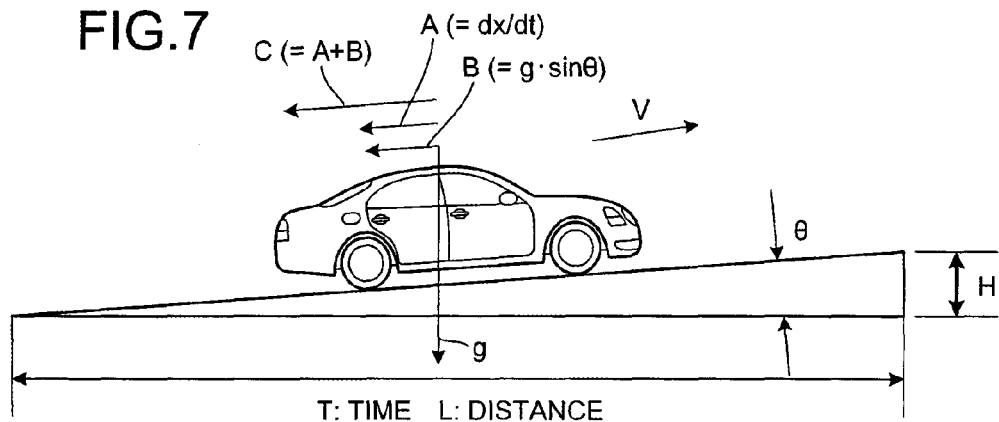
FIG. 7 is a diagram schematically depicting acceleration of a vehicle traveling on a road having a gradient.

The road gradient θ used as a variable in the right-hand side of Equations (1) to (5) will be described. FIG. 7 is a diagram schematically depicting acceleration of a vehicle traveling on a road having a gradient. As depicted in FIG. 7, the vehicle traveling on a sloping road having a gradient of θ is subject to acceleration A associated with travel of the vehicle (=dx/dt) and a travel-direction component B of acceleration g of gravity (=g·sin θ). The second term on the right-hand side of Equation (1) represents synthetic acceleration C of the acceleration A associated with travel of the vehicle and the travel-direction component B of acceleration g of gravity. It is assumed that L, T, and V denote the distance of a section through which the vehicle travels, traveling time, and traveling speed.

If fuel consumption is estimated without considering the road gradient θ, the error between estimated fuel consumption and actual fuel consumption is smaller for a region with a smaller road gradient θ while the error between estimated fuel consumption and actual fuel consumption becomes larger for a region with a larger road gradient θ. Therefore, the navigation apparatus 300 estimates fuel consumption with consideration of the road gradient, i.e., the fourth information, to improve estimation accuracy.

With regard to the road on which the vehicle travels, the gradient can be known by using a clinometer equipped on the navigation apparatus 300, for example. If no clinometer is equipped on the navigation apparatus 300, road gradient information included in map data can be used, for example.

(Travel History)

Description will be made of information recorded in the storage device read at step S407 of FIG. 4 in the travel distance estimating process. FIG. 8 is an explanatory diagram of an example of road information in the travel distance estimating process by the navigation apparatus. As depicted in FIG. 8, road information data 800 is a table using area information 801 and a road type 802 as main keys to record average speed 803, average acceleration 804, and road gradient 805 for each record. Vehicle travel history read and written by the navigation apparatus 300 are stored as the road information data 800.

The area information 801 is, for example, the name of a place, an area divided for each regional name (e.g., given range), etc. The road type 802 is a type of a road that can be classified by differences in road conditions such as legal speed, road gradient, road width, and the presence of traffic signals. For example, the road type includes a national road, an expressway, a general road, a narrow street in an urban area (narrow street), etc.

The average speed 803, the average acceleration 804, and the road gradient 805 are the travel history acquired during travel of the vehicle. Although not depicted, the road information data 800 may have records of the actual energy consumed when the vehicle traveled through a given travel interval in the past, the time (traveling time) required for the vehicle to travel through the given travel interval in the past, vehicle information, etc. As described above, information acquired through communication from another vehicle or statistical information stored in the apparatus in advance may be utilized for this information.

(Travel Resistance)

Travel resistance to which the vehicle is subject will be described. The navigation apparatus 300 calculates the travel resistance by Equation (1), for example. The travel resistance is generally generated on the moving body during acceleration and during travel depending on road type, road gradient, road condition, etc.

$$Rt = \mu Mg + kv^2 + Mg \sin\theta + (M+m)\alpha \tag{1}$$

where,

Rt: travel resistance v: speed

α: acceleration (Definition of Recovery Rate β)

Figure 9:
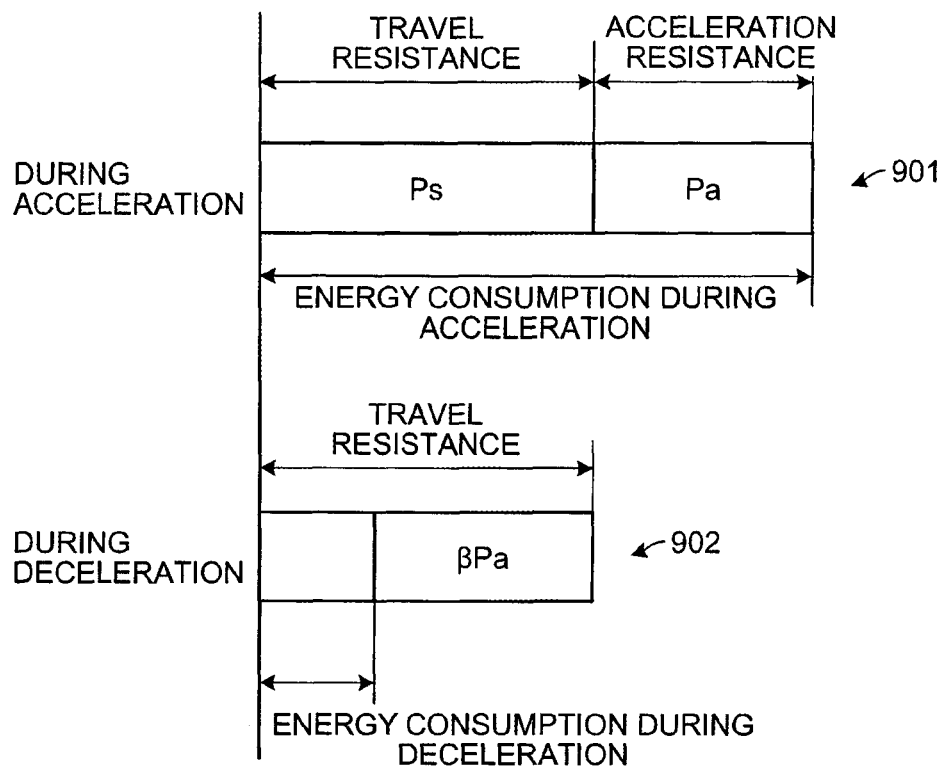
FIG. 9 is an explanatory diagram of a calculation method for a recovery rate of an EV vehicle.

The concept of recovery rate of EV vehicles will be described. FIG. 9 is an explanatory diagram of a calculation method for a recovery rate of an EV vehicle. Assuming that the vehicle accelerates from a point of departure, then travels at constant speed, and subsequently decelerates and stops when traveling through a travel interval, the recovery rate β is defined by using Equations (10) to (13). Pt denotes energy consumption (actual energy consumption) measured when the vehicle actually travels through the travel interval. It is assumed that the road gradient in the travel interval is θ=0.

In FIG. 9, energy consumption 901 during acceleration is the sum of energy consumption Ps due to travel resistance and energy consumption Pa due to acceleration resistance as expressed by Equation (10). The energy consumption Ps and Pa are theoretically-calculated data.

$$Pt = Ps + Pa \tag{10}$$

The following assumption is further made. The travel resistance to which the vehicle is subject is equivalent from acceleration to deceleration. The kinetic energy generated due to the acceleration resistance is partially converted into electric power during deceleration and stored as recovered energy. Therefore, since energy is consumed due to the travel resistance during deceleration of the vehicle while the kinetic energy generated by the acceleration resistance is recovered, the actual amount of energy consumed is acquired by subtracting the recovered energy amount from the energy amount due to the travel resistance.

Therefore, when β denotes a rate (recovery rate) of a kinetic energy amount due to the acceleration resistance recovered during deceleration, energy consumption 902 during deceleration is the difference of the energy consumption Ps due to travel resistance and a recovered energy β·Pa as expressed by Equation (11).

$$Pt = Ps - \beta \cdot Pa \tag{11}$$

The actual energy consumption Pt is the sum of Equation (10) and Equation (11) as expressed by Equation (12).

$$Pt = Ps + (1-\beta) \cdot Pa \tag{12}$$

Since the actual energy consumption Pt, the energy consumption Ps due to travel resistance, and the energy consumption Pa due to acceleration resistance are known values, the recovery rate β can be calculated by using Equation (13).

$$\beta = 1 - (Pt - Ps)/(Pa) \tag{13}$$

Figure 10:
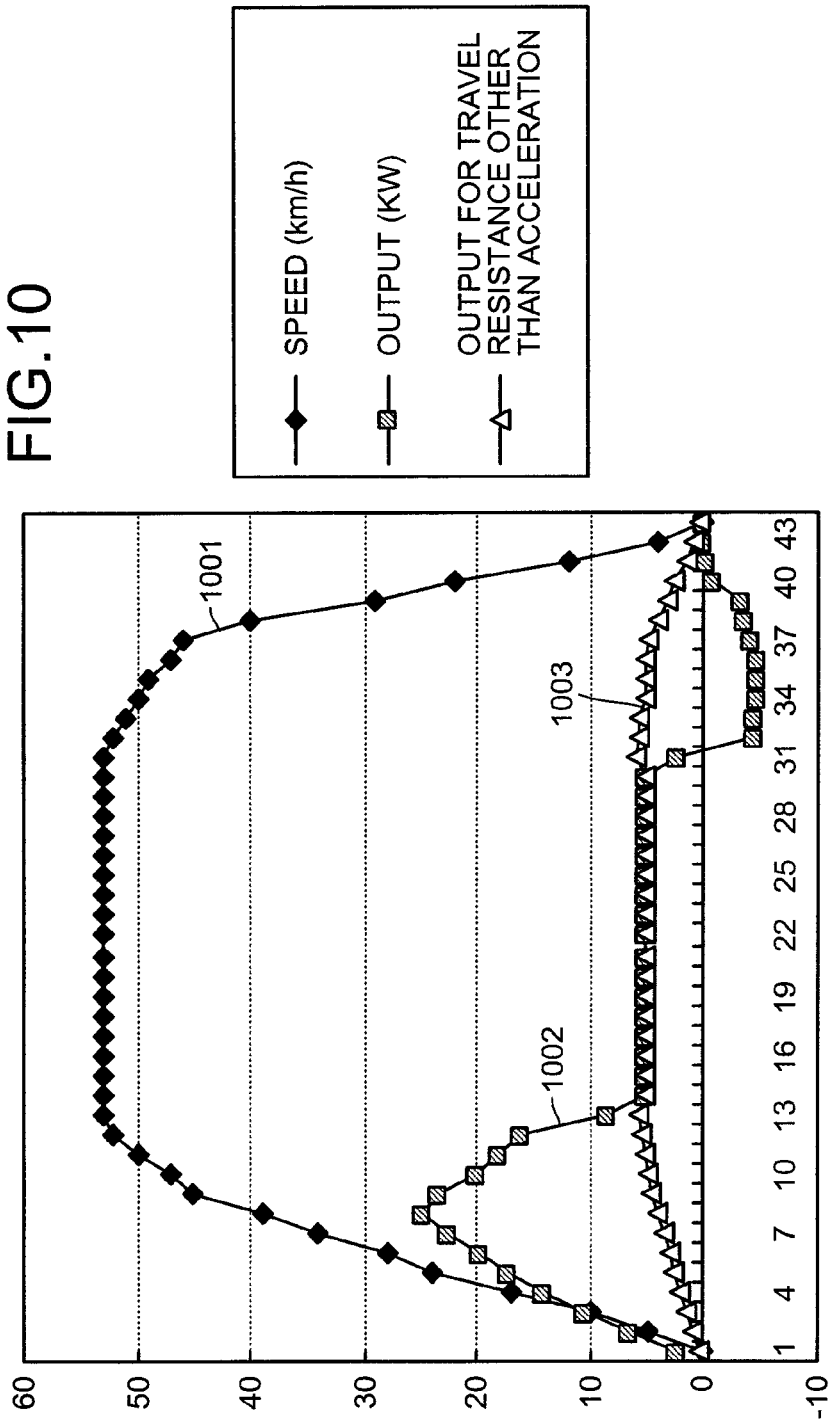
FIG. 10 is a graph depicting the relationship between speed and output of EV vehicle.
Figure 11:
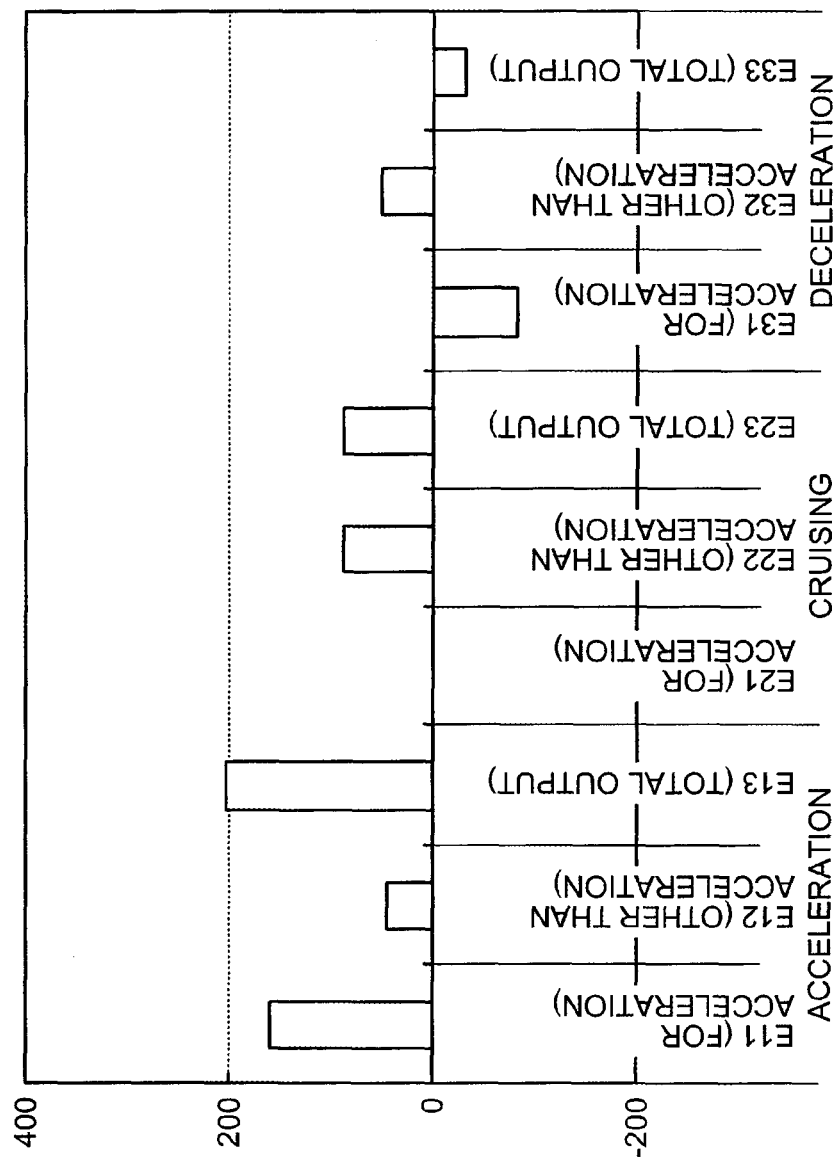
FIG. 11 is a diagram depicting characteristics of energy consumption classified by a travel state of the EV vehicle.

A method of calculating the recovery rate β based on the actual travel of the vehicle will be described. FIG. 10 is a diagram depicting the relationship between speed and output of EV vehicle. FIG. 11 is a diagram depicting characteristics of energy consumption classified by a travel state of the EV vehicle. In FIGS. 10 and 11, the positive side of the vertical axis indicates energy consumption, the negative side of the vertical axis indicates the amount of energy conserved, and the horizontal axis indicates time. First, the vehicle traveling through a travel interval is measured in terms of speed, energy consumption (output), and the amount of energy due to travel resistance other than acceleration/deceleration at given intervals of time. The result is depicted in FIGS. 10 and 11.

In FIG. 10, a line chart (hereinafter referred to as "speed") 1001 indicates a change in speed of the vehicle traveling through the travel interval. A line chart (hereinafter referred to as "output") 1002 indicates the difference of energy consumption and recovered energy of the vehicle traveling through the travel interval. A line chart (hereinafter referred to as "travel resistance") 1003 indicates the amount of energy due to travel resistance other than during acceleration of the vehicle traveling through the travel interval.

In the result depicted in FIG. 10, when the vehicle accelerates (the speed 1001), both the output 1002 and the travel resistance 1003 increase. When the vehicle travels at a constant speed, both the output 1002 and the travel resistance 1003 have a constant value. When the vehicle decelerates, the output 1002 decreases into the negative range and the travel resistance 103 decreases within the positive range.

Thus, as indicated by the output 1002, energy is recovered during deceleration. On the other hand, since the travel resistance 103 varies only within the positive range of the vertical axis, the travel resistance other than acceleration only results in energy consumption. Such changes in the output 1002 and the travel resistance 103 are depicted in FIG. 11, for example.

As depicted in FIG. 11, energy consumption E13 during acceleration is the sum of energy consumption E11 due to acceleration resistance and energy consumption E12 due to travel resistance other than acceleration/deceleration, as expressed by Equation (14). The energy consumption due to travel resistance other than acceleration/deceleration is the amount of energy consumed for maintaining travel.

$$E13 = E11 + E12 \tag{14}$$

Energy consumption E23 during travel at a constant speed (cruising) is energy consumption E22 due to travel resistance other than acceleration/deceleration, as expressed by Equation (15).

$$E23 = E22 \tag{15}$$

Energy consumption E33 during deceleration is the sum of the amount of energy E31 recovered during deceleration and energy consumption E32 due to travel resistance other than acceleration/deceleration, as expressed by Equation (16).

$$E33 = E31 + E32 = E32 \oplus \beta \times E11 \tag{16}$$

Therefore, the recovery rate β is a ratio of the energy consumption E11 during acceleration and the amount of energy E31 recovered during deceleration and can be calculated by using Equation (17).

$$\beta = E33/E11 \tag{17}$$

Therefore, Equation (17) corresponds to Equation (9). In particular, a recovery rate calculation equation described as Equation (9) is derived as follows. Assuming that the second term on the right-hand side in Equation (6) is energy consumption Pacc of an acceleration component in a travel interval, the energy consumption Pacc of an acceleration component is acquired by subtracting energy consumption during idling (the first term on the right-hand side) and energy consumption due to travel resistance (the fourth term on the right-hand side) from the total energy consumption in the travel interval (the left-hand side) and is expressed by Equation (8).

$$P_{acc} = P - k_1 - k_3 \cdot (\overline{V}^3 + a_1 \cdot \overline{V}^2 + a_2 \cdot \overline{V}) \tag{8}$$

In Equation (8), it is assumed that the vehicle is not affected by the road gradient θ (θ=0). A calculation equation of the recovery rate β expressed as Equation (9) can be acquired by substituting Equation (8) into Equation (6).

$$\beta = 1 - \frac{2 \cdot P_{acc}}{k_2 \cdot |\overline{\alpha}| \cdot \overline{V}} \tag{9}$$

The recovery rate β is about 0.7 to 0.9 in EV vehicles, about 0.6 to 0.8 in HV vehicles, and 0.2 to 0.3 in gasoline vehicles.

The recovery rate of gasoline vehicles is the ratio of energy consumption during acceleration of the moving body and the amount of energy subjected to fuel cut during deceleration.

(Display Example of Travelable Range)

Figure 12:
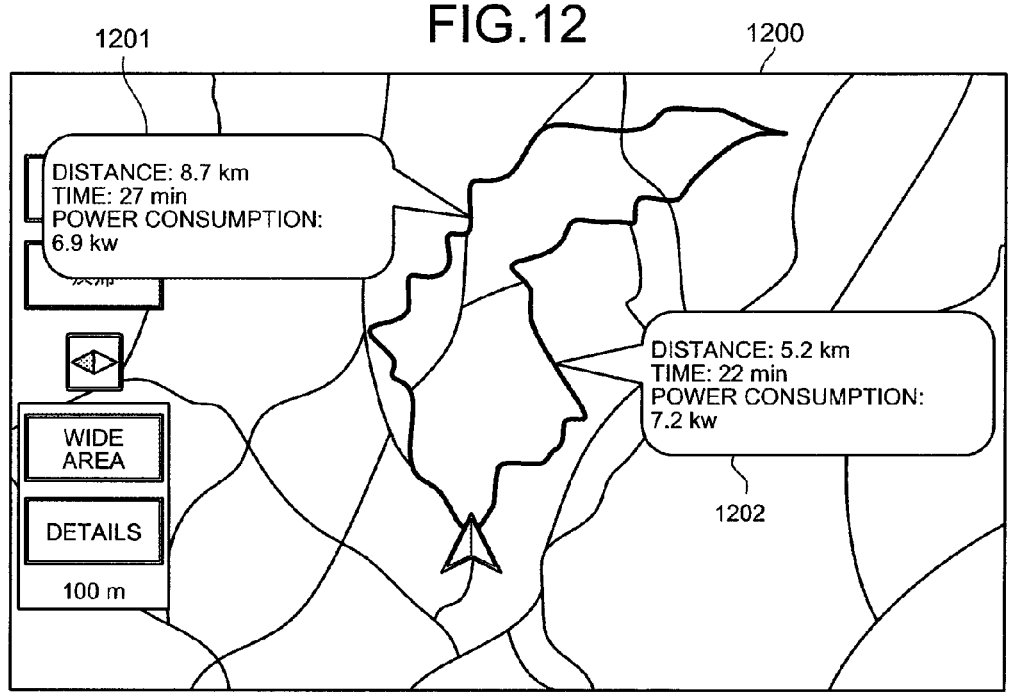
FIG. 12 is an explanatory diagram of an example of a display screen displayed on the display of the navigation apparatus.

Information displayed on a display in the travel distance estimating process will be described. FIG. 12 is an explanatory diagram of an example of a display screen displayed on the display of the navigation apparatus. As depicted in FIG. 12, for example, a display 1200 displays, along with map data, route information 1201 and 1202 acquired by a route search based on a travelable distance estimated by the navigation apparatus 300. This is an example of information displayed on the display when the vehicle can reach the destination from the current position within the travelable distance estimated by the navigation apparatus 300. For example, this is a state when the process described at step S413 of FIG. 4 is executed.

For example, the navigation apparatus 300 estimates a travelable distance of the vehicle (or the amount of energy consumed to reach a destination if the vehicle can travel to the destination) at departure or during travel of the vehicle based on, for example, estimated energy consumption and a remaining energy amount of the vehicle. The navigation apparatus 300 displays along with map data, for example, the route information 1201 and 1202 retrieved by a route search based on the travelable distance, when the vehicle can travel to the destination with the remaining amount of energy of the vehicle on the display 1200. The navigation apparatus 300 displays on the display 1200, for example, the distance from the current position to the destination, the required time, the amount of energy consumed until arrival at the destination, etc., as the route information 1201 and 1202. The navigation apparatus 300 may display on the display 1200, a travelable area along with map data.

In this way, the navigation apparatus 300 displays along with map data on the display 1200, route information, areas, etc. retrieved by a route search based on a travelable distance. Thus, the user can visually check multiple routes and areas reachable with the remaining amount of energy of the vehicle.

As described above, the navigation apparatus 300 estimates energy consumption for a travel interval by using a consumption energy estimating equation, based on the energy consumed in the idling state, during acceleration/deceleration, and during travel of the vehicle and the energy recovered during acceleration/deceleration of the vehicle. Since the navigation apparatus 300 calculates and estimates energy consumption for each travel state associated with a different amount of energy consumption, energy consumption can be estimated more accurately.

The navigation apparatus 300 estimates energy consumption for a travel interval based on speed and acceleration of the vehicle. Therefore, the navigation apparatus 300 can estimate energy consumption reflecting the actual travel state in the travel interval.

The navigation apparatus 300 estimates a travelable range of the vehicle based on the remaining energy amount acquired from the vehicle. Therefore, the navigation apparatus 300 can estimate to which point, the vehicle can travel with the currently remaining energy or through which route, the vehicle can travel and reach the destination with the currently remaining energy.

Equations (1) to (9) described above include vehicle information, road information, etc. as variables. Therefore, the navigation apparatus 300 can estimate energy consumption and a travelable distance reflecting the actual state of the moving body and the actual road conditions in the travel interval.

The navigation apparatus 300 estimates energy consumption for a travel interval based on energy consumption per unit time in the travel interval and the time (traveling time) required for the moving body to travel through the travel, interval in the past. Therefore, the navigation apparatus 300 can estimate energy consumption reflecting the traveling time required for a travel state of the user in the travel interval.

The navigation apparatus 300 estimates a travelable distance of the vehicle by using any one or more of the consumed energy estimating equations described as Equations (2) to (7) based on the speed, acceleration, and remaining energy amount of the vehicle. Since the navigation apparatus 300 estimates the travelable distance of the vehicle based on the travel state when the vehicle traveled through the travel interval in the past and the actual remaining energy, the travelable distance can be estimated more accurately.

The navigation apparatus 300 estimates energy consumption of the vehicle by using an estimating equation averaging the amount of energy consumed per unit time during acceleration of the moving body and the amount of energy recovered per unit time during deceleration of the moving body as the second information related to the energy consumed and recovered during acceleration/deceleration of the moving body. Therefore, the navigation apparatus 300 can estimate energy consumption for a travel interval before travel, with consideration of both the amount of energy consumed during acceleration and the amount of energy recovered during deceleration.

The travel distance estimating method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

EXPLANATIONS OF LETTERS OR NUMERALS

100 travel distance estimating apparatus
101 current position acquiring unit
102 variable acquiring unit
103 estimating unit
104 correcting unit
105 storage unit
110 display unit

The invention claimed is:

1. A travel distance estimating apparatus comprising an estimating unit that estimates energy consumption for a moving body to travel through a travel interval, based on a consumed energy estimating equation made up of first information related to energy consumed during stop of the moving body while a drive source in an operating state, second information related to energy consumed and recovered during acceleration/deceleration of the moving body, and third information related to energy consumed by resistance generated during travel of the moving body.

2. The travel distance estimating apparatus according to claim 1, further comprising a variable acquiring unit that acquires and uses information related to speed of the moving body in the travel interval as variables related to the first information, the second information, and the third information, wherein the estimating unit estimates energy consumption of the moving body by using the consumed energy estimating equation based on the information related to the speed of the moving body acquired by the variable acquiring unit.

3. The travel distance estimating apparatus according to claim 2, wherein
the variable acquiring unit acquires a traveling time required for travel through the travel interval, and
the estimating unit estimates based on the consumed energy estimating equation, energy consumption per unit time for travel through the travel interval and multiplies the energy consumption per unit time by the traveling time to estimate energy consumption for travel through the travel interval.

4. The travel distance estimating apparatus according to claim 1, wherein
the estimating unit uses an estimating equation averaging an energy amount per unit time consumed during acceleration of the moving body and an energy amount per unit time recovered during deceleration of the moving body as the second information.

5. The travel distance estimating apparatus according to claim 1, wherein
the variable acquiring unit acquires information related to a remaining energy amount of the moving body, and
the estimating unit uses the remaining energy amount as a solution of the consumed energy estimating equation to estimate a point at which the remaining energy amount is exhausted and calculate a travelable distance of the moving body.

6. The travel distance estimating apparatus according to claim 5, wherein the estimating unit estimates a point at which the remaining energy amount is exhausted, the estimating unit estimating the point by repeating a process of estimating energy consumption for travel through a given travel interval among successive travel intervals and estimating energy consumption for travel through a subsequent travel interval adjacent to the given travel interval until the remaining energy amount is exhausted from a current position of the moving body.

7. The travel distance estimating apparatus according to claim 1, wherein the estimating unit further incorporates into the consumed energy estimating equation, fourth information related to the energy consumed and recovered due to changes in height of a position of the moving body.

8. The travel distance estimating apparatus according to claim 1, further comprising
a current position acquiring unit that acquires a current position of the moving body, and
a storage unit that stores map information sectioned into given ranges, and type information for each travel interval, wherein
if a given travel interval or a subsequent travel interval includes the current position of the moving body or is a travel interval of a particular type, the variable acquiring unit acquires information related to speed of the moving body traveling through the travel interval at this point, as variables related to the first information, the second information, and the third information.

9. The travel distance estimating apparatus according to claim 1, further comprising a storage unit that stores travel history of the moving body, wherein
if a given travel interval or a subsequent travel interval does not include the current position of the moving body or is not a travel interval of a particular type, the variable acquiring unit acquires from the travel history of the moving body and as variables related to the second information and the third information, information related to speed of the moving body during past travel through the travel interval.

10. The travel distance estimating apparatus according to claim 9, wherein
the storage unit stores the travel history of the moving body for each given range, and
the variable acquiring unit acquires from the travel history of the moving body and as variables related to the first information, the second information, and the third information, the information related to the speed of travel in a given range.

11. The travel distance estimating apparatus according to claim 1, wherein the estimating unit estimates energy consumption for the travel interval based on Equation (1) or Equation (2) below as the consumed energy estimating equation.

$$P_{t1} = P_{idle} + \frac{(\mu + \sin\theta)Mg}{\varepsilon\eta} \cdot V + \frac{\kappa}{\varepsilon\eta}V^3 + \frac{M+m}{\varepsilon\eta}|\alpha| \cdot V \quad (1)$$

where,
$P_{t1}$: energy consumption per unit time (kW/sec) during acceleration and during travel
$P_{idle}$ energy consumption during idling (first information)
: rolling resistance
: road gradient
M: weight of a moving body
g: acceleration of gravity
: energy consumption efficiency of moving body
k: air resistance coefficient
v: speed
| |: synthetic acceleration
: recovery rate
m: weight of a rotating body of traveling apparatus; and $$P_{t2} = P_{idle} + \frac{(\mu - \beta \cdot \sin\theta)Mg}{\varepsilon\eta} \cdot V + \frac{\kappa}{\varepsilon\eta}V^3 - \beta \cdot \frac{M+m}{\varepsilon\eta}|\alpha| \cdot V \quad (2)$$

where,
$P_{t2}$: energy consumption per unit time (kW/sec) during deceleration.

12. The travel distance estimating apparatus according to claim 1, further comprising a correcting unit that corrects information related to the moving body and used as variables of the consumed energy estimating equation, wherein
the variable acquiring unit acquires actual energy consumption of the moving body for the travel interval, and
the correcting unit corrects based on the actual energy consumption, the information related to the moving body and used as variables of the consumed energy estimating equation.

13. The travel distance estimating apparatus according to claim 1, wherein information estimated by the estimating unit is displayed on a display unit along with map data.

14. A travel distance estimating method of a travel distance estimating apparatus that estimates energy consumption of a moving body, the travel distance estimating method comprising
estimating energy consumption of the moving body traveling through a travel interval, based on a consumed energy estimating equation made up of first information related to energy consumed during stop of the moving body with a drive source in an operating state, second information related to energy consumed and recovered during acceleration/deceleration of the moving body, and third information related to energy consumed by resistance to which the moving body is subject during travel.

15. A computer-readable recording medium storing a travel distance estimating program that causes a computer to execute estimating energy consumption of the moving body traveling through a travel interval, based on a consumed energy estimating equation made up of first information related to energy consumed during stop of the moving body with a drive source in an operating state, second information related to energy consumed and recovered during acceleration/deceleration of the moving body, and third information related to energy consumed by resistance to which the moving body is subject during travel.

* * * * *